US009088519B2

(12) United States Patent
Guichard et al.

(10) Patent No.: US 9,088,519 B2
(45) Date of Patent: Jul. 21, 2015

(54) ALLOCATING AND DISTRIBUTING LABELS FOR PACKET ENCAPSULATION

(75) Inventors: James Guichard, New Boston, NH (US); David Ward, Los Gatos, CA (US); Jan Medved, Pleasanton, CA (US); Maciek Konstantynowicz, Haddenham (GB)

(73) Assignee: Juniper Networks, Inc., Sunnyvale, CA (US)

( * ) Notice: Subject to any disclaimer, the term of this patent is extended or adjusted under 35 U.S.C. 154(b) by 175 days.

(21) Appl. No.: 13/525,073

(22) Filed: Jun. 15, 2012

(65) Prior Publication Data
US 2013/0336315 A1 Dec. 19, 2013

(51) Int. Cl.
*H04L 12/723* (2013.01)
*H04L 12/46* (2006.01)

(52) U.S. Cl.
CPC ............ *H04L 45/50* (2013.01); *H04L 12/4645* (2013.01)

(58) Field of Classification Search
CPC . H04L 12/4633; H04L 12/4645; H04L 45/04; H04L 45/50
USPC .............. 370/389–394, 395.5, 400, 466, 467, 370/469, 473–476
See application file for complete search history.

(56) References Cited

U.S. PATENT DOCUMENTS

| 6,606,681 | B1 * | 8/2003 | Uzun ........................... 711/108 |
| 8,094,575 | B1 | 1/2012 | Vadlakonda et al. |
| 2003/0137978 | A1 | 7/2003 | Kanetake |
| 2004/0223497 | A1 | 11/2004 | Sanderson et al. |
| 2005/0220014 | A1 | 10/2005 | DelRegno et al. |
| 2007/0286090 | A1 * | 12/2007 | Rusmisel et al. ............. 370/252 |
| 2009/0310610 | A1 * | 12/2009 | Sandstrom .................... 370/392 |
| 2012/0275461 | A1 * | 11/2012 | Chen et al. ................. 370/395.5 |

FOREIGN PATENT DOCUMENTS

WO    2010056582 A2    5/2010

OTHER PUBLICATIONS

Extended European Search Report received in corresponding European Application No. 13171813.2, dated Sep. 6, 2013, 7 pp.
Beckhaus et al., "LDP Downstream-on-Demand in Seamless MPLS," draft-ietf-mpls-ldp-dod-01, Network Working Group, Internet-Draft, Mar. 12, 2012, 33 pp.
Office Action from U.S. Appl. No. 13/243,310, dated Jul. 30, 2013, 7 pp.

(Continued)

*Primary Examiner* — Xavier Szewai Wong
(74) *Attorney, Agent, or Firm* — Shumaker & Sieffert, P.A.

(57) ABSTRACT

In one example, a network device receives a packet to be forwarded according to a label switching protocol, determines a service to be performed on the packet by a service network device, sends a label request message to the service network device, wherein the label request message indicates support for labels having a particular length, wherein the particular length is larger than twenty bits (e.g., forty bits), and wherein the label request message specifies the service to be performed on the packet, receives, in response to the label request message, a label mapping message defining a label of the particular length, appends the label to the packet to form a Multi-Protocol Label Switching (MPLS)-encapsulated packet, and forwards the MPLS-encapsulated packet according to the label switching protocol.

29 Claims, 7 Drawing Sheets

(56) References Cited

OTHER PUBLICATIONS

Response to Office Action dated Jul. 30, 2013, from U.S. Appl. No. 13/243,310, filed Oct. 30, 2013, 15 pp.
Notice of Allowance from U.S. Appl. No. 13/243,310 dated Dec. 13, 2013, 7 pp.
Guichard et al. U.S. Appl. No. 13/243,310, filed Sep. 23, 2011 entitled Using Network Labels Without Standard-Defined Syntax and Semantics.
Aggarwal et al. "MPLS Upstream Label Assignment and Context-Specific Label Space" Network Working Group, Request for Comments: 5331, Aug. 2008, 14 pgs.
Andersson et al. "LDP Specification" Network Working Group, Request for Comments: 5036, Oct. 2007, 136 pgs.
Rosen et al. "Multiprotocol Label Switching Architecture" Network Working Group, Request for Comments: 3031, Jan. 2001, 62 pgs.
Rosen et al. "MPLS Label Stack Encoding" Network Working Group, Request for Comments: 3032, Jan. 2001, 24 pgs.
Thomas et al. "LDP Applicability" Network Working Group, Request for Comments: 3037, Jan. 2001, 7 pgs.
Thomas et al. "LDP Capabilities" Network Working Group, Request for Comments: 5561, Jul. 2009, 13 pgs.
Le Faucheur et al. "Multi-Protocol Label Switching (MPLS) Support of Differentiated Services", IETF RFC 3270, Network Working Group, May 2002, pp. 60.
Response to Office Action dated Jan. 2, 2014, from Counterpart European Patent Application No. 13171813.2, filed May 23, 2014, 3 pp.

* cited by examiner

ALLOCATING AND DISTRIBUTING LABELS FOR PACKET ENCAPSULATION

TECHNICAL FIELD

The techniques of this disclosure relate to computer networks and, more particularly, to routing packets within computing networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Packet-based computer network increasingly utilize label switching protocols for traffic engineering and other purposes. In a label switching network, network devices, often referred to as Label Switching Routers or LSRs, use Multi-Protocol Label Switching (MPLS) signaling protocols to establish Label Switched Paths (LSPs). The LSRs utilize these MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR. In some cases, upstream label allocation may be used.

Typically, LSRs at the edge of the MPLS network, referred to as Label Edge Routers (LERs), establish paths through the MPLS network in accordance with the MPLS signaling protocols. LERs may forward signaling messages throughout the network to distribute the appropriate labels in accordance with the MPLS signaling protocol. The LSRs, which typically reside at the core of the MPLS network, along a given path may then update their respective forwarding tables with the appropriate labels. Often LSRs update the forwarding tables to indicate whether to append, swap or remove one of the labels corresponding to a given path.

Upon receiving a unit of data, such as an IP packet, entering the MPLS network, LERs may then inspect the packet, prepend one or more MPLS labels to the packet based on the result of the inspection, and forward the packet via the LSP associated with the label. Upon receiving the labeled packet, downstream LSRs may append an additional label, swap labels or remove the label based on the LSR's forwarding table. The LSR however need not inspect the MPLS packet but may instead base forwarding strictly on the one or more MPLS labels included within a label stack pre-pended to the packet. In this respect, the LSR may perform protocol-independent forwarding and may be used to encapsulate other types of packets. As a result, the LSRs may, by forgoing detailed packet inspection, more efficiently and quickly forward packets throughout the MPLS network.

SUMMARY

In general, techniques are described for allocating and distributing labels for packet encapsulation within a computer network, such as a network including devices implementing Multi-Protocol Label Switching (MPLS) protocols. Conventional MPLS provides techniques for encapsulating packets with 20-bit fixed format labels, which may be used for tunneling the packets through the network via one or more network tunnels, providing indications of services to be applied to packets, or for other uses. In accordance with the techniques of this disclosure, network devices are configured to utilize other sizes of labels, such as 40-bit labels (sometimes referred to as "doublewide labels"), as well as to interpret the contents of a 40-bit label. Devices also advertise the use of a 40-bit label, so that other devices can differentiate 20-bit labels from 40-bit labels.

In one example, a method includes sending, by a first network device, a label request message to request a label mapping from a second network device, wherein the label request message indicates support for labels having a particular length larger than twenty bits, and wherein the label request message specifies a service provided by the second network device and to be performed on packets subsequently forwarded to the second network device in accordance with the label mapping, receiving, in response to the label request message, a label mapping message defining a label of the particular length, appending, by the first network device, the label to a packet to form a Multi-Protocol Label Switching (MPLS)-encapsulated packet, and forwarding, by the first network device, the MPLS-encapsulated packet according to a label switching protocol.

In another example, a network device includes one or more network interfaces configured to send and receive network data, and a control unit configured to send, via the one or more network interfaces, a label request message to request a label mapping from a service network device, wherein the label request message indicates support for labels having a particular length larger than twenty bits, and wherein the label request message specifies a service provided by the service network device and to be performed on packets subsequently forwarded to the service network device in accordance with the label mapping, receive, via the one or more network interfaces in response to the label request message, a label mapping message defining a label of the particular length, append the label to a packet to form a Multi-Protocol Label Switching (MPLS)-encapsulated packet, and forward the MPLS-encapsulated packet according to a label switching protocol.

In another example, a computer-readable storage medium includes instructions for causing a processor to send a label request message to request a label mapping from a second network device, wherein the label request message indicates support for labels having a particular length larger than twenty bits, and wherein the label request message specifies a service provided by the second network device and to be performed on packets subsequently forwarded to the second network device in accordance with the label mapping, receive a label mapping message defining a label of the particular length, append the label to a packet to form a Multi-Protocol Label Switching (MPLS)-encapsulated packet, and forward the MPLS-encapsulated packet according to a label switching protocol.

In another example, a system includes a network device and a service network device. The network device is configured to send a label request message to request a label mapping from the service network device, wherein the label request message indicates support for labels having a particular length larger than twenty bits, and wherein the label request message specifies a service provided by the service network device to be performed on packets subsequently forwarded to the service network device in accordance with the label mapping. The service network device is configured to receive the label request message, associate a label of the particular length with the service, and send, in response to the label request message, a label mapping message defining the label of the particular length associated with the service to the network device. The network device is further configured to receive the label mapping message, append the label to a packet to form a Multi-Protocol Label Switching (MPLS)-encapsulated packet, and forward the MPLS-encapsulated packet according to a label switching protocol. Moreover, the service network device is configured to receive the MPLS-encapsulated packet, and perform the service on the packet based on the label.

In another example, a method includes receiving, by a first network device, a label request message from a second network device, wherein the label request message indicates support for labels having a particular length, wherein the particular length is larger than twenty bits, and wherein the label request message specifies a service to be performed on a packet, associating a label of the particular length with the service, sending, in response to the label request message, a label mapping message defining the label of the particular length associated with the service, receiving a packet encapsulated with the label, and performing the service on the packet based on the label.

The details of one or more examples are set forth in the accompanying drawings and the description below. Other features, objects, and advantages will be apparent from the description and drawings, and from the claims.

DETAILED DESCRIPTION

Figure 1:
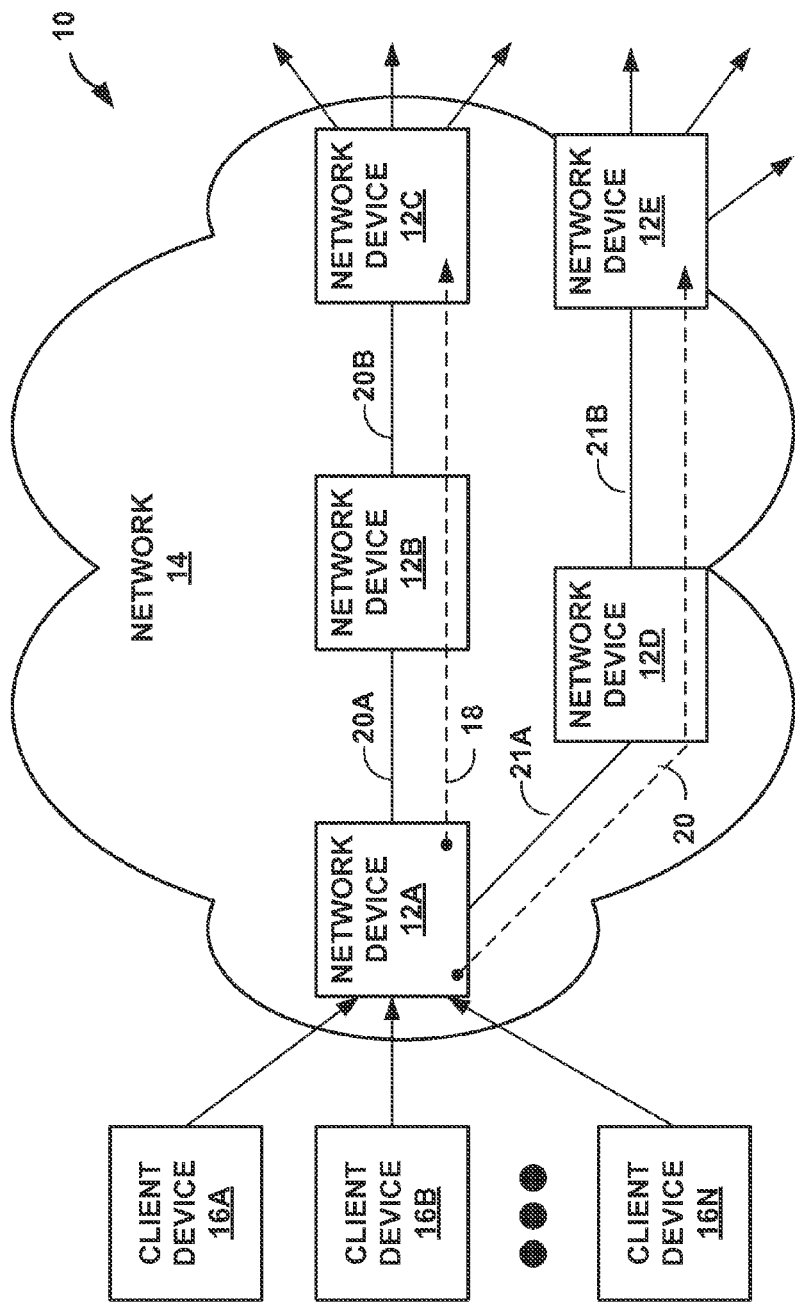
FIG. 1 is a block diagram illustrating a network system in which one or more network devices perform label transmission according to the techniques described in this disclosure.

FIG. 1 is a block diagram illustrating a network system 10 in which one or more of network devices 12A-12E perform label transmission according to the techniques described in this disclosure. Network devices 12A-12E ("network devices 12") may each represent a network device, such as a router, that forwards packets, such as IP packets, or any other discrete unit of data, via a set path or route through a network, such as network 14, according to one or more labels associated with each packet. That is, an ingress router, such as network device 12A, may append a multiprotocol label switching (MPLS) label stack having one or more labels. Network devices 12 operate as label switching routers (LSRs) to forward traffic within network 14 in accordance with the labels. In some cases, LSRs 12 may forward the traffic in accordance with their existing routing tables for network 14, e.g., underlying routing tables for IP traffic. In other cases, network devices 12 may utilize traffic engineering protocols to establish paths through particular network devices. In general, these labels used within network 14 may be associated with forwarding equivalence (FEC) classes (e.g., destinations), may define particular paths, along which an MPLS encapsulated packet is to be forwarded, the path itself, services to be applied to the packet, or other information useful by network devices 12 when tunneling packets through network 14.

Some of the labels in the MPLS stack, sometimes referred to as "doublewide MPLS labels" in this disclosure, have a width that is different than (e.g., twice as wide as) the width conventionally allocated to labels for MPLS. Such labels may, for example, have a width of 40 bits, rather than 20 as conventionally used. Moreover, a doublewide MPLS label may include two or more portions that define a service instance and service information within the corresponding service instance. Rather than having 20 bits allocated to the service instance and 20 bits allocated to the service information, the labels of this disclosure may have any width. Thus, the service instance portion may comprise fewer than, or more than, 20 bits, and the service instance portion may also comprise more or fewer than 20 bits. Thus, these portions may cross a conventional label boundary. Use of labels having a number of bits other than 20 bits, such as 40 bits, is also described in Guichard et al., "USING NETWORK LABELS WITHOUT STANDARD-DEFINED SYNTAX AND SEMANTICS," U.S. patent application Ser. No. 13/243,310, filed Sep. 23, 2011, which is hereby incorporated by reference in its entirety.

Figure 3:
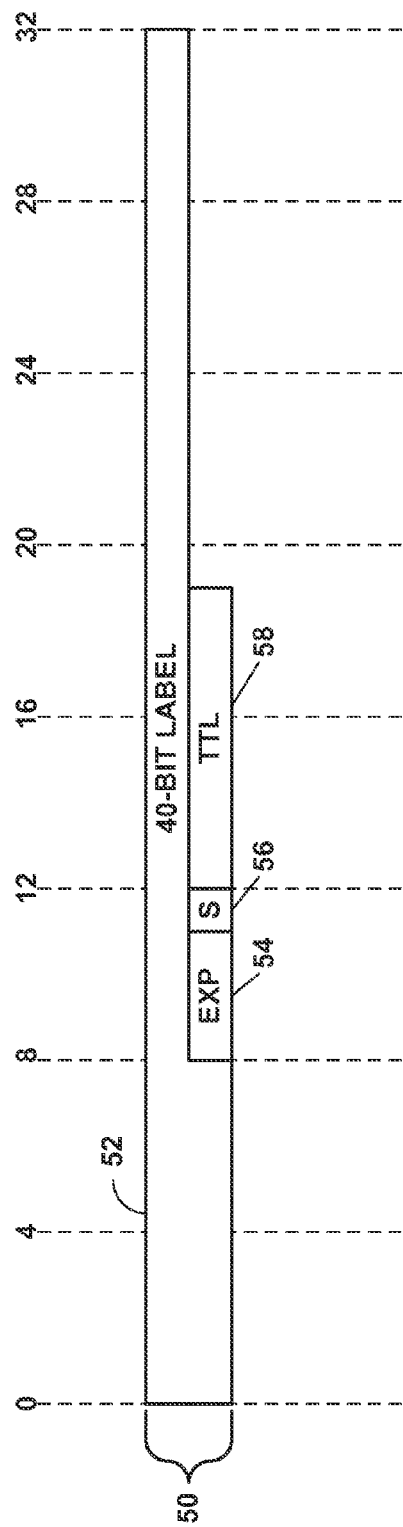
FIG. 3 is a conceptual diagram illustrating an example 52-bit label stack including a 40-bit label.

Although generally described as 40-bit labels or doublewide labels, the labels of this disclosure may correspond to any labels other than conventional 20-bit labels without predefined semantics. Thus, techniques described with reference to 40-bit labels or doublewide labels should also be understood as being applicable to other label lengths. An example of a 40-bit label forming part of a label stack is illustrated in FIG. 3, as discussed in greater detail below.

In general, 40-bit labels do not have predefined semantics. In accordance with the techniques of this disclosure, network devices 12 may define semantics for portions of the labels. For example, network device 12A may associate a label with a service, allocating a first portion of the label to define a service instance associated with the service and a second portion of the label to define service information associated with the service. As another example, network device 12A may allocate a first portion of the label (e.g., eight bits) to identify a service instance associated with a service, and a second portion of the label (e.g., 32 bits) to identify a subscriber of that service, where the subscriber may correspond to one of client devices 16.

Network devices may support various label widths and various protocols for exchanging MPLS labels. For example, network devices 12 may support any or all of service labels having 20-bit widths, 40-bit widths, or other widths, e.g., a number of bits greater than 20-bits. In general, network devices 12 indicate support for 40-bit label widths (or other non-20-bit widths) during session initialization, which may be performed using techniques similar to those described in RFC-5036, Andersson et al., "LDP Specification," Network Working Group, October 2007, available at http://http://tools.ietf.org/html/rfc5036, which is hereby incorporated by reference in its entirety. For example, network devices 12 may indicate support of 40-bit widths using procedures similar to those documented in RFC-5561, Thomas et al., "LDP Capabilities," Network Working Group, July 2009, available at http://tools.ietf.org/html/rfc5561, which is hereby incorporated by reference in its entirety.

For example, using techniques similar to those of RFC-5561 but in accordance with this disclosure, a network device, such as network device 12A, may advertise support for labels other than 20-bit labels, such as 40-bit labels, during session initialization according to RFC-5036. For example, as discussed in greater detail with respect to FIG. 4 below, network device 12A may advertise support for 40-bit labels using a type-length-value (TLV) structure, such as a TLV structure defined according to service instance capability indicator 70 of FIG. 4. In accordance with the techniques of this disclosure, the TLV structure may comprise a L4-L7 Service Instance capability indicator, which indicates support for 40-bit labels. In some examples, the L4-L7 Service Instance capabilities indicator is included as a forwarding equivalence class (FEC) element within a label request message, such as label request message 140 of FIG. 8, as discussed in greater detail below.

Network device 12A acts as an ingress router to network 14, in the example of FIG. 1. Because network device 12A represents an interface between the ingress to a network tunnel through network 14 and devices external to network 14, network device 12A may be referred to as a "Label Edge Router" or LER. Network device 12A receives packets from devices external to network 14, determines tunnels through which to forward the packets, determines next hops along the corresponding tunnel, service instances, and service information for the packets, and constructs MPLS packets by prepending one or more labels representative of this determined information to the packets. In some examples, network device 12A prepends a doublewide service label to a packet including information defining the service instance and service information for the packet, and a transport label identifying a next hop along the tunnel. Collectively, the service label, and the transport label, along with any additional or alternative labels, form an MPLS label stack for the packet.

In order to obtain appropriate 40-bit labels for various service instances, network device 12A may issue label requests to one or more of network devices 12B-12E that provide various services. For example, after receiving a packet from one of client devices 16, e.g., client device 16A, network device 12A may determine that the packet is to be encapsulated according to MPLS, and that client device 16A has subscribed to a service that is performed by network device 12B. Network device 12A may then determine whether MPLS labels have been already allocated for encapsulating and forwarding the packets to network device 12B. If not, network device 12A sends, to network device 12B (which may be referred to as a "service network device") a label request message specifying the FEC to which client device 16A and the requested service correspond. The label request message also indicates that network device 12A supports 40-bit labels, in this example.

Figure 9:
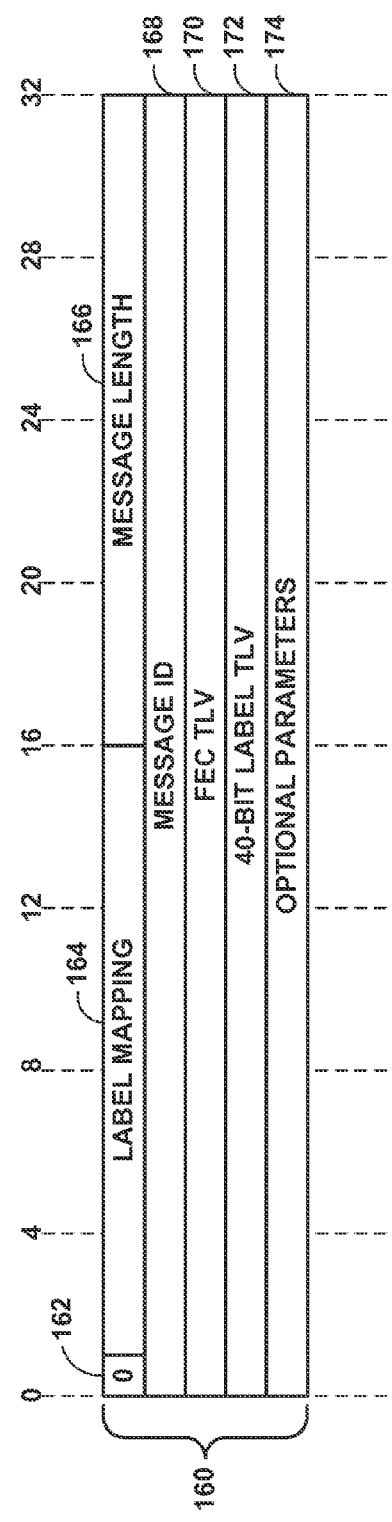
FIG. 9 is a conceptual diagram illustrating an example label mapping message.

In response to the label request message, network device 12B associates a label with the service instance specified by the FEC of the label request message. Alternatively, the label may have already been previously associated with the FEC, and network device 12B may simply determine the label that is associated with the FEC. In any case, network device 12B constructs a label mapping message that associates a label with the service instance of the label request message and sends the label mapping message to network device 12A. FIG. 9 illustrates an example label mapping message 160, as discussed in greater detail below. The label assigned to the service instance generally has a length that corresponds to the length of label indicated in the label request message, e.g., 40-bits.

In either case, network device 12A encapsulates the packet from client device 16A with a label, along with other labels and label stack information, in accordance with a label mapping message issued by network device 12B. Thus, the label stack used to encapsulate the packet may include one or more 40-bit labels for one or more services, as well as other labels, such as labels associated with label switched paths, e.g., a tunnel through network 14 and a next-hop along the tunnel.

Other network devices 12 of network 14 may use data of the label stack to determine next hops along the tunnel, the tunnel itself, and services to be applied to the packet. Because the next hop changes for each network device along the tunnel, network devices 12 other than network device 12A may swap the transport label of the MPLS label stack with another label that defines the next hop along the corresponding tunnel. Accordingly, each of network devices 12 may represent and be referred to herein as a "Label Switching Router" or LSR. While described with respect to this particular type of network device 12, any MPLS-enabled network device capable of routing and forwarding packets according to MPLS labels may implement MPLS to facilitate debugging, troubleshooting or other actions within a network system, such as network system 10. Service network devices of network device 12 may use 40-bit labels (or labels of other widths, e.g., labels greater than 20 bits) that were previously allocated by the service network devices to determine services to be applied to packets encapsulated by such labels.

As shown in FIG. 1, network system 10 includes network 14 and client devices 16A-16N ("client devices 16"). Client devices 16 may be computing devices, such as mobile devices, tablets, PDAs, laptop or desktop computers, or any other computing devices. Network 14 may represent a public network that is owned and operated by a service provider to connect with numerous client devices, such as client devices 16. As a result, network 14 may be referred to herein as a Service Provider (SP) network or, alternatively, as a "core network." Example service providers include Verizon Communications Inc. or American Telephone & Telegraph (AT&T) Company.

Client devices 16 may be networks or devices including mobile devices. The devices and networks of client devices 16 may operate according to a wide variety of network protocols, such as any of the 802.3X family of network protocols related to the Ethernet protocol, any of the 802.1X family of wireless networking protocols, Global System for Mobile Communications (GSM), Carrier Division Multiple Access (CDMA), High Speed Packet Access (HSPA), Long Term Evolution (LTE), an Internet Protocol (IP) protocol, an Asynchronous Transfer Mode (ATM) protocol, and a Transmission Control Protocol (TCP). Moreover, in the case where one or more of client devices 16 is a network, the network may comprise a Virtual Private Network (VPN), a Large Area Network (LAN), or a Wide Area Network (WAN). Although not shown in FIG. 1 for ease of illustration purposes, each network may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

Network 14 may interconnect the plurality of client devices according to any number of protocols. Commonly, however, a transit network, such as network 14, that interconnects various client devices 16 to one another implements a mechanism or protocol for quickly switching packets, which may comprise packets, or any other discrete unit of data. Often, these transit networks that implement these mechanisms are referred to as a "data-switched network" or "packet-switched network." Multi-Protocol Label Switching (MPLS) refers to one example of a mechanism that network 14 may implement to switch packets via one or more paths through network 14. And according to the techniques of this disclosure, network 14 may also implement MPLS to provide service information on a per-packet basis. For purposes of illustration, it is assumed herein that network 14 implements the MPLS data-carrying and service identification mechanisms and, network 14 may therefore be referred to herein as an "MPLS network." While described below with respect to MPLS, the double-wide label distribution techniques may be utilized by any network device that employs labels to forward packets through a network.

The MPLS data-carrying mechanism of network 14 may be viewed as lying between layer 2 and layer 3 of the Open Systems Interconnection (OSI) model and is often referred to as a layer 2.5 protocol. Network 14 may implement one or more MPLS protocol to negotiate and establish LSPs for encapsulating and forwarding many different types of packets through the network, including IP packets. MPLS may be considered a "protocol" in the sense that it comprises a suite of protocols that network 14 may implement to exchange MPLS labels within a network, such as a Label Distribution Protocol (LDP), and for establishing traffic-engineered LSPs, such as a Resource Reservation Protocol (RSVP) or extensions thereof (e.g., a so-called RSVP Traffic Engineering or RSVP-TE protocol). Further information regarding MPLS and the various features of MPLS, as well as, general architectural information regarding MPLS can be found in Request for Comments (RFC) 3031, titled "Mutiprotocol Label Switching Architecture," prepared by the Network Working Group of the Internet Engineering Task Force (IETF), dated January 2001, which is hereby incorporated by reference in its entirety.

The techniques described in this disclosure extend MPLS to provide information about OSI layer 4 (referred to as the "transport layer") through layer 7 (referred to as the "application layer") services and applications, as well as subscriber information about those services and applications. In this manner, service instances may be referred to as "L4-L7 service instances." The techniques of this disclosure extend MPLS to provide information about higher level OSI model services to network devices, such as network devices 12 of network 14.

As stated above, network devices 12 form and utilize doublewide MPLS labels, in accordance with the techniques of this disclosure, where the doublewide MPLS labels may include service instance portions and service information portions. The service instance portions generally define a context in which values of the service information portions are interpreted. Thus, the service information portion of a service label may also be referred to as a context portion of the service label. Network devices supporting the use of context portions of service labels, such as network devices 12, read a context value from the context portion of the label in the MPLS label stack.

The value of the context portion of the label may be used to identify a table within the network device in which to look up data for a service information portion of the label following context portion of the label. The context (or service instance) may generally correspond to any or all of a client device from which the packet originated and/or a destination of the packet. Thus, a context portion of a label may assign a specific context to a service information portion of label immediately following the context portion of the label. As an example of how context labels affect an underlying MPLS label, a network device would interpret differently two MPLS encapsulated packets with the same values for service information portions of MPLS labels, but with different context portions of the labels. Further information regarding conventional use of context labels may be found in Request for Comments (RFC) 5331, titled "MPLS Upstream Label Assignment and Context-Specific Label Space," prepared by the Network Working Group of the Internet Engineering Task Force (IETF), dated August 2008, which is hereby incorporated by reference in its entirety. Rather than having two separate labels, one for context and one for service information within the context, network devices 12 in the techniques of this disclosure utilize a single label having a context (or service instance) portion and a service information portion. The label may be wider than conventional MPLS labels and the portions allocated to service instance and service information may be more or less than the conventional width of MPLS labels.

In addition to MPLS labels having a greater number of bits compared to ordinary MPLS labels, network devices may interpret doublewide MPLS labels flexibly and free from standard-defined semantics. As an example, a user, such as an administrator, may configure network devices 12 to interpret doublewide labels as having two or more portions. Typically, a doublewide MPLS label is interpreted as having two or more portions, such as a service instance portion and a service information portion. A network device may associate the value of the service instance portion of a doublewide label with a context for interpreting values of the service information portion. The service information portion defines one or more network services or applications network devices 12 apply to the packet encapsulated by the doublewide MPLS label. Some services and/or applications that a network device may provide based on the value of a service instance portion of a doublewide MPLS label includes content caching, or any other information related to a network, service, application, or protocol. This disclosure also provides techniques for using TLVs to define syntax and semantics for service labels having more than 20-bits, e.g., 40-bit labels.

Network devices supporting the use of doublewide MPLS labels also allow network devices that do not interpret double-wide MPLS labels on the same network, while still allowing the use of doublewide MPLS labels. That is, the use of doublewide MPLS labels may provide for backwards compatibility with conventional network devices that are configured to perform MPLS. To allow a mix of the two types of network devices on the same network, a user, such as a network administrator, may configure network devices 12 to interpret the service instance and service information portions as having the same width. Network devices supporting doublewide MPLS labels, in accordance with the techniques of this disclosure, interpret the first portion as the service instance label and the second portion as the service information portion.

As an example of a mixed network of doublewide supporting and non-supporting devices works, network device 12A may support doublewide MPLS labels. Network devices 12A and 12C may support doublewide MPLS labels, whereas network device 12B may not. Network device 12A may apply a doublewide MPLS label with equal service instance and service information portions to a packet of data and forward the MPLS-encapsulated packet to network device 12B. Because network device 12B does not support doublewide MPLS labels, network device 12B may interpret the service information and service information portions of the doublewide MPLS label as a context label and a standard MPLS label, respectively. Network device 12B may be ignorant of the service information associated with the label, and may simply forward the MPLS-encapsulated packet to a next hop, in this example, network device 12C. Network 12C interprets the service instance and service information portions, may apply one or more services to the encapsulated packet, and may forward the packet onto its next hop.

One of the flexible aspects of doublewide MPLS labels is that a user, such as an administrator, may configure and/or reconfigure network devices using a programming interface, such as an application programming interface (API), to change the widths associated with the different portions of doublewide MPLS labels and any associations the portions of the labels may have with contexts and services within those contexts. In this manner, doublewide labels in accordance with the techniques of this disclosure are considered to have no standard-specified syntax or semantics. Instead, the doublewide labels are assigned syntax and semantics after devices implemented to recognize and interpret doublewide labels have been deployed. The administrator may select the width in bits of the service instance portions of MPLS labels based on the number of services that network devices 12 may provide or is expected to provide. To allocate space for a higher number of services, the administrator may configure network devices 12 to allocate a larger number of bits to the service information portions of doublewide MPLS labels and fewer bits to the service instance portions. If the number of services or the amount of service information is lower, the administrator may configure network devices 12 to allocate fewer bits to the service information portions.

An administrator may configure network devices 12 to allocate the size of the service instance portion in a similar manner to the service information portion of a doublewide MPLS label. As stated above, the service instance portion of a doublewide MPLS label may contain subscriber identifiers or other data for identifying a service context. As an example, an administrator may configure how network devices 12 interpret the size of the service instance portion of a doublewide MPLS label depending upon the number of clients and/or servers, or number of service instances that are to be represented within network 14. An administrator may also allocate more bits to the service instance portion of the label if the administrator wants to provide additional room that may be needed later for additional subscribers, but is not currently needed.

As another example of an administrator reconfiguring network devices, the administrator may choose to reconfigure network devices 12 to allocate more bits to the service information portions of doublewide MPLS labels, and fewer bits to the service instance portion of the label if the number of subscribers to one or more services becomes larger, and the amount of label space allocated to the service information portion is insufficient to give each subscriber a unique identifier.

In yet another example, the network administrator may choose to reconfigure network devices 12 to allocate more bits to the service instance portions of doublewide MPLS labels. An administrator may choose to allocate more bits to the service information portion of the labels if the administrator wishes to add additional services to the network, and the number of bits available in the service information portion of the label is insufficient to allocate each service provided a particular service instance value without having duplicates. The administrator may also choose to allocate additional bits to the service information portion so there is additional space available for future services that the administrator may add.

To configure network devices 12, a user, such as an administrator, may use a software development kit (SDK). The SDK may allow the user to compile native code, object code, bytecode, or other programs, which may be executed on a network device with a compatible programming interface, and to provide instructions to network devices 12 via APIs provided by network devices 12. The administrator may create the configuration information on a computing device not connected to and with a different hardware architecture from the network device to be configured. The computing device executes the SDK, allowing the user to develop configuration data for network devices 12. In this manner, the administrator may create the configuration information on the device. The computing device may then provide the configuration data to network devices 12 via the APIs. Additionally or alternatively, one or more of network devices 12 may implement the SDK, and a user may log into the network device, execute the SDK on the network device via a remote device, and cause the network device to distribute the configuration data throughout network 14.

As an example, the administrator may use a desktop computer to compile configuration information for network device 12A using an SDK, such as the Junos or Junos Space SDKs. The SDK may allow the administrator to create configuration information for the one or more network devices using one or more programming languages, such as C, C++, Java, a domain-specific language such as a routing language, or any other programming language.

Once the administrator has created configuration information detailing how one or more of network devices 12 may interpret doublewide MPLS labels, and wishes to upload it to one or more network devices, the administrator may use a variety of techniques to reconfigure the network device. The administrator may initiate a network transfer, such as secure copy protocol (SCP), file transfer protocol (FTP), or another similar network file transfer session, which transmits the administrator's network configuration information to the one or more network devices to be configured. The administrator may also configure the one or more network devices using a command-line interface (CLI), which may be executed locally or remotely.

Rather than configure each of network devices 12 individually, an administrator may configure one network device using a network transfer or command-line interface and rely on network devices 12 to use an extended version of a protocol, such as Label Distribution Protocol (LDP), Resource Reservation Protocol—Traffic Engineering (RSVP-TE), Multi-Protocol Border Gateway Protocol (MP-BGP), or another protocol capable of distributing MPLS label information, to distribute configuration information associated with one or more portions of doublewide MPLS labels over network 14. As an example, an administrator may configure one network device, such as network device 12A using a command-line interface or a network transfer mechanism described above. Network device 12A may utilize a label distribution protocol to establish an LSP for one or more service instances, and transmit the configuration information related to the one or more service instances to other network devices on the same LSP.

In some examples, network devices 12 implement LDP or another protocol, such as MP-BGP, to establish at least one path 18 through network 14. For the purposes of example, LDP is discussed as one example implementation. A network device may also implement LDP to establish other paths, such as path 20 through network 14. In addition to establishing routes through network 14, network 14 may utilize an extended version of LDP to communicate service information to other network devices on network 14, such as network devices 12B and 12D. That is, devices implementing a protocol may communicate information about one or more level 4 through level 7 services to provide for an MPLS encapsulated packet as well as specific information about those one or more services. Network device 12A may communicate the syntax of the service labels, such as doublewide labels including service instance and service information portions in accordance with the techniques of this disclosure, to one or more upstream or downstream network devices, such as network devices 12 in network 14. In accordance with the techniques of this disclosure, label request messages specify a service instance, as well as support for a particular length of label (e.g., a 40-bit label), and request a label of that particular length for the service instance. In response, label mapping messages associate a label of that particular length for the service instance.

More particularly, network 14 may include the above described plurality of network devices 12 which may, as described above, represent LSRs. Network devices 12A, 12C, and 12E may each reside at an edge of network 14, and as a result may each be referred to herein as a "Label Edge Router" or LER. Typically, LERs, such as network devices 12A, 12C, and 12E establish the one or more paths through network 14 in accordance with a network protocol, such as LDP. Further information regarding LDP, the various services and features of LDP, as well as, general information regarding labels and the applicability of LDP to MPLS can be found in Request for Comments (RFC) 3037, titled "LDP Applicability," prepared by the Network Working Group of the Internet Engineering Task Force (IETF), dated January 2001, which is hereby incorporated by reference in its entirety.

In the example of FIG. 1, network device 12A establishes a first label switched path 18 through network 14 that flows from network device 12A to network device 12B via link 20A and from network device 12B to network device 12C via link 20B. Network device 12A also establishes a second label switched path that flows from network device 12A to network device 12D via link 21A and from network device 12D to network device 12E via link 21B. Paths, such as paths 18 and 20 typically represent a unidirectional flow of network traffic that is established according to one of the MPLS signaling protocols (for example, LDP). Thus, when network device 12A establishes paths 18 and 20 in accordance with a version of LDP, path 18 may only transmit or carry network traffic from network device 12A to network device 12C but may not transmit or carry network traffic from network device 12C to network device 12A. Similarly, path 20 may only transmit or carry network traffic from network device 12A to network device 12E, but may not transmit or carry network traffic from network device 12E to network device 12A.

Considering this unidirectional flow of network traffic along a given path, for each path, one network device may be referred to as an "ingress network device" while another network device may be referred to as an "egress network device." With respect to path 18, network device 12A may represent the ingress network device and network device 12C may represent the egress network device. With respect to path 20, network device 12A may again represent the ingress network device and network device 12E may represent the egress network device. Network devices 12B and 12D neither act as an ingress point for traffic entering path 18 nor an egress point for traffic leaving path 18, and may be referred to as "transit network devices." When network devices 12B and 12D swap labels, e.g., transport labels, of the MPLS label stack, network devices 12B and 12D may be referred to as "label switching routers," or LSRs.

Network device 12A may establish paths 18 and 20 by first discovering other of network devices 12 that implement LDP. These other network devices 12 may be referred to as "LDP peers." Upon discovering each LDP peer, network device 12A may initiate an LDP session with the discovered one of network devices 12. Network device 12A may then, via the LDP session, negotiate parameters for the LDP session, such as a method by which to exchange labels, including doublewide MPLS labels. After negotiating the parameters, network device 12A and the other one of network devices 12 exchange one or more labels in accordance with the negotiated parameters.

Network device 12A may, for example, establish an LDP session with network device 12B to exchange labels. Network device 12A may, via the established LDP session, advertise bindings between a Forwarding Equivalence Class (FEC) and a label or a portion of a label, such as a service instance portion. A FEC refers to a set of packets that a given network device forwards to the same next hop out of the same interface with the same treatment, such as applying the same service or services applied to the packets. A portion of a doublewide MPLS label may uniquely identify a FEC, and each of network devices 12 may maintain a plurality of FECs. Network device 12A may also receive bindings between FECs and labels from network devices 12B and 12D. Network device 12A may resolve the bindings received from network devices 12B and 12D with those already maintained by network device 12A to resolve paths through network 14. Network devices 12 may each perform this exchange until each of network devices 12 maintains a representation of a topology of network 14.

As an example of how establishing a FEC works with doublewide MPLS labels, an administrator may configure network device 12A, which is an LER in the example of FIG. 1, with doublewide MPLS label configuration information as described above. The configuration information may include data about how many portions are present in one or more doublewide MPLS labels, the width in bits of each portion of the labels, data type information about each portion, one or more services to provide for packets encapsulated with the one or more doublewide MPLS labels, and other information about how to interpret the portions of the labels. Information about how to interpret the portions may instruct network devices on what operations to perform on the various portions of doublewide MPLS labels and what services to provide for packets encapsulated in a doublewide MPLS label stack.

Example operations that a network device may perform on a label stack including one or more doublewide MPLS labels include removing a label, adding a label, swapping a label, or performing an operation on a portion of a label. A network device, such as an LSR, may remove a label corresponding to one or more services when those one or more services have been completed. An LSR may also remove a label when MPLS-encapsulated traffic is leaving the MPLS-enabled portion of the network.

Network device 12A may utilize a protocol, such as LDP or MP-BGP to establish a first label switched path 18 through network 14 that flows from network device 12A to network device 12B via link 20A and between 12B, and 12C over link 20B. Network device 12A may further establish a FEC with network device 12B, which associates the values one or more portions of one or more doublewide MPLS labels with a next hop, one or more services, and with an interface over which to send the one or more labels. Additionally, network device 12A may send configuration information about MPLS labels to network device 12B via link 20A using an extended form of LDP or MP-BGP. Network device 12B may communicate the same information via link 20B to network device 12C also using a form of LDP or MP-BGP and may also establish a FEC between one or more service instance values, a network interface, and a next hop to network device 12C.

Based on this topology, network devices 12 may resolve the topology to determine the one or more paths through network 14 by which to forward packets associated with each FEC. In some instances, these bindings may be referred to as a binding or association between a label or portion of a label and a next hop, as the FEC may be used to determine the next hop along a given path and one or more services to apply to MPLS-encapsulated packets associated with the FEC. Based on these bindings, each path through network 14 may be associated with one or more, and often, a plurality of labels, identifying each subsequent next hop along the path and the services to provide for packets associated with each FEC. Network device 12A may also reserve bandwidth or other resources via the managing aspect or protocol of MPLS, e.g., RSVP. By using the managing aspect of various protocols, network devices 12A may also ensure a particular quality, level or class of service for a given path. For example, network device 12A may reserve 50 mega-bits per second (Mbps) of bandwidth for path 18 and/or path 20 in accordance with RSVP.

After establishing path 18 in accordance with MPLS, network device 12A may receive a packet from one of client devices 16. Upon receiving the packet, network device 12A may determine to which FEC the packet belongs by inspecting the packet and, based on the FEC, append an MPLS stack, including a corresponding doublewide MPLS label, to the packet. Network device 12A may push a plurality of labels onto the label stack. Network device 12A may then route the packet along a given path, e.g., path 18, through network 14 according to the label.

Assuming network device 12A forwards the packet via path 18, network device 12B receives the packet with the appended label stack. Network device 12B may examine the top label, which may comprise a transport label that defines a "next hop," corresponding to network device 12B relative to network device 12A for path 18. Based on stored configuration information, network device 12B interprets one or more portions of a doublewide label of the label stack, and applies one or more services to the MPLS-encapsulated packet based on the doublewide label. Network device 12B may then swap all or a portion of the label with another label or portion of a label that network device 12B associates with path 18, where the swap may comprise removing or popping the original label appended by network device 12A and pushing or appending a new label, or altering one or more portions of a current label. For example, network device 12B may pop the transport label that identifies network device 12B as the next hop, then push a label that identifies network device 12C as the next hop.

After receiving the MPLS-encapsulated packet network device 12B, may also alter one or more portions of one or more labels in the MPLS label stack. Network device 12B may add to, subtract from, or perform another mathematical or Boolean operation, such as an XOR or NAND operation, on one or more portions of one or more doublewide MPLS labels. Network device 12B may alter portions of a label because altering the portions may provide state information about one or more services to a next network device receiving the packet. In an instance where network device 12B is performing a subscriber billing service to the received packet, for example, a portion of a label may indicate the usage of a quantity, such as bandwidth or traffic that a customer has used. Network device 12B may increment a portion of a doublewide MPLS label to indicate to the next network device that the customer associated with the MPLS label has used some additional amount of the resource.

After receiving the packet, network device 12B may forward the packet via link 20B to network device 12C along path 18. Network device 12C may inspect the label, and determine that a label or label portion identifies path 18, which may cause network device 12C to remove the packet from path 18 and forward the packet to its destination. Network device 12C may remove or pop the label from the label stack of the MPLS header, and forward the packet to the destination indicated in the original packet header, such as an IP header, instead of forwarding the packet based on the MPLS header. Network device 12C may then forward the packet to the destination via any one of a number of routes, as indicated in FIG. 1 by the plurality of arrows exiting network device 12C. In this manner, network 14 may implement the MPLS protocol to establish paths and switch packets along the paths according to the labels associated with the paths. In this respect, paths, such as path 18, may be referred to as a Label Switched Path (LSP).

Similar to LSP 18, network 14 may also form other LSPs, such as LSP 20. In forming LSP 20, network devices 12A, 12D, and 12E may discover each other and build a network topology using a protocol, such as LDP, or MP-BGP. LSP 20 flows from network device 12A via link 21A to network device 12D, and then via link 21B to network device 12E. As with link 18, packets flowing over LSP 20 may flow unidirectionally from ingress device 12A to egress device 12E. Network devices 12A, 12D, and 12E may establish one or more FECs over LSP 20 using a protocol, such as LDP, RSVP, or MP-BGP. The labels that network devices 12A, D, and E transmit may differ from labels transmitted over path 18, however. As stated above, a network device may associate a FEC with one or more services, a next hop, and an interface of a network device. Network device 12A may transmit MPLS-encapsulated packets with labels having one set of label portions over with one set of widths over one interface, such as the interface between network device 12A and network device 12B, and another set of label portions with a different set of label widths over another interface, such as the interface between network device 12A and network device 12D.

Network 14 may implement MPLS for a number of reasons. First, MPLS moves path selection and route decisions to the edges of the network, thereby improving forwarding performance in the core of the network. To illustrate, in the example of FIG. 1, only network device 12A, (or LERs) inspect the packet to determine to which FEC the packet belongs and the destination indicated by the original packet, respectively. Transit network devices 12B and 12D, however, forward packets based on the appended label and may forgo further packet inspection. While LERs, such as network devices 12A, 12C and 12E, may establish and terminate paths and therefore act as ingress and egress network devices that perform this inspection prior to admitting packets to and removing packets from paths, transit network devices, such as network device 12B, and 12D, may forgo the inspection and instead forward packets based on the labels regardless of the protocol to which each packet corresponds. As a result, transit network devices, such as network device 12B, may more efficiently forward packets, as network device 12B may forward packets based on labels without having to perform additional inspection of packets.

Second, MPLS networks, such as network 14 may transmit any type of packet or network traffic that corresponds to a number of different protocols, including IP. In this respect, MPLS may not require any protocol-specific hardware architecture in the core of the network and may be considered protocol independent. Thus, service providers may employ MPLS network 14 to service a wide variety of customers that implement a wide variety of network architectures to form customer networks, such as customer networks 16.

Network device 12A may push the determined label into the label stack of the packet and forward the packet with this MPLS header to network device 12B. Network device 12B of network 14 may receive the packet from network device 12A of network 14 via a path 18 established in accordance with LDP or another protocol, as described above. The received packet may include one or more labels each containing two or more portions, such as a service instance portion and a service information portion. The service instance portion may define one or more services to provide for the MPLS encapsulated packet, and the service information portion may indicate something about the one or more services associated with the packet.

Network device 12B may typically examine the service instance and service information portions of the encapsulated packet. Based on the contents of the service instance portion and service information portion, network device 12B may apply one or more services to the packet. Services may include one or more of: traffic logging, subscriber identification, content information, or another network service or application. Network device 12B may swap the top label of the stack with a new label maintained by network device 12B, where the new label is associated with network device 12C as a next hop along path 18. Network devices 12B may then forward the packet according to the new label to network device 12C via path 18. Network device 12C may pop all labels of the MPLS label stack before forwarding the original packet (e.g., the packet as received by ingress network device 12A) to a destination indicated by the packet.

Figure 2:
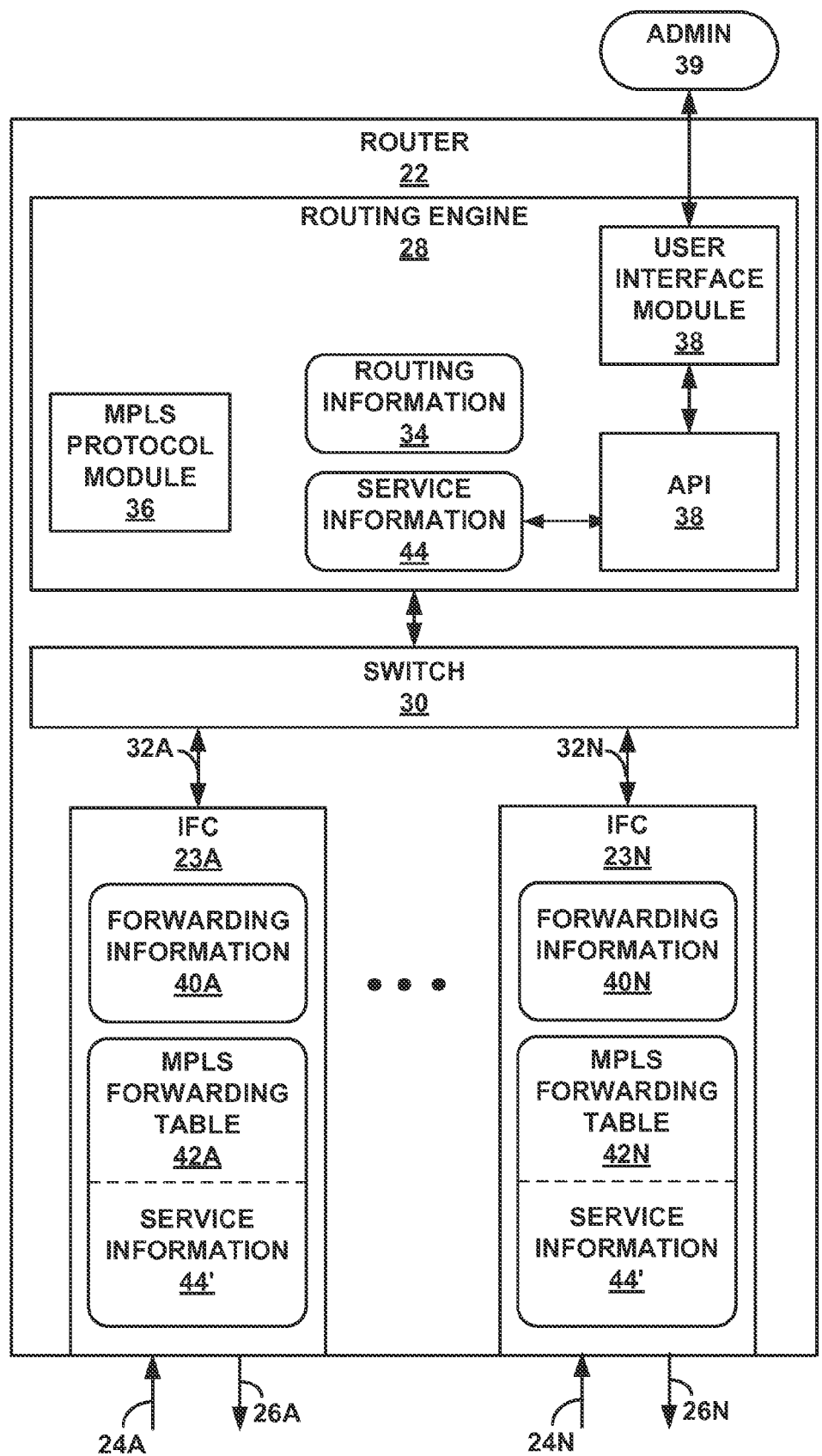
FIG. 2 is a block diagram illustrating an example of a router that implements techniques related to Multi-Protocol Label Switching (MPLS) label transmission for labels longer than 20 bits, in accordance with techniques described in this disclosure.

FIG. 2 is a block diagram illustrating an example of a router 22 that implements the doublewide MPLS label transmission techniques described herein. Router 22 may represent a transit network device similar to network device 12B, however the techniques may be implemented by any network device including ingress and egress network devices, as well as, any other network device that utilizes labels to forward traffic.

In the example of FIG. 2, router 22 includes interface cards 23A-23N (collectively, IFCs 23) that receive and send packets, such as packet flows, via network links 24A-24N and 26A-26N, respectively. Router 22 may include a chassis (not shown) having a number of slots for receiving a set of cards, including IFCs 23. Each card may be inserted into a corresponding slot of the chassis for electrically coupling the card to routing engine 28 via high-speed switch 30 and internal data paths 32A-32N (collectively, internal data paths 32).

Switch 30 also provides an interconnect path between each of IFCs 23. Switch 30 may comprise, for example, switch fabric, switchgear, a configurable network switch or hub, or other high-speed switching mechanisms. Internal data paths 32 may comprise any form of communication paths, such as electrical paths within an integrated circuit, external data busses, optical links, network connections, wireless connections, or other communication paths. IFCs 23 may be coupled to network links 24A-24N and 26A-26N via a number of physical interface ports (not shown). Generally, IFCs 23 may each represent one or more network interfaces by which router 22 may interface with links of a network, such as links 20 of network 14.

In general, routing engine 28 operates as a control unit for router 22. Routing engine 28 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Routing engine 28 may further include computer readable storage medium, such as dynamic memory (for example, Random Access Memory or RAM, dynamic RAM or DRAM, and a cache) and/or static memory (for example, static RAM or SRAM, a Read Only Memory or ROM, and Flash memory), and storage devices, such as Compact Disc ROMs or CDROMs, hard drives, RAM drives, and Digital Video Disc (DVD) drives. In some instances, the computer-readable storage medium may include instructions that cause a programmable processor to perform the techniques described herein.

Routing engine 28 may further include an MPLS protocol module 36 and a user interface (UI) module 38. MPLS protocol module 36 represents a hardware and/or software module that implements the above described signaling and path management protocols, such as the above described LDP, the above described RSVP, the above described MP-BGP, or other protocols. When implemented in software, it is assumed that router 22 includes corresponding hardware for executing the software, such as a processor, and for storing software instructions, such as a computer-readable storage medium. MPLS protocol module 36 may be extended to implement, not only these protocols, but also the doublewide MPLS transmission techniques described herein. User interface module 38 may represent a hardware and/or software module that presents a user interface with which an administrator or other user, such as administrator 39 ("admin 39"), may interact to configure and/or view label service information, as described below in more detail.

Routing engine 28 may further include and maintain routing information 34 that reflects a topology of a network. Router 22 may maintain routing information 34 in the form of one or more tables, databases, link lists, radix trees, databases, flat files, or any other data structure. Based on routing information 34, routing engine 28 generates forwarding information 40A-40N ("forwarding information 40") for IFCs 23.

Each of the IFCs 23 includes a forwarding component (not shown) that forwards packets in accordance with forwarding information 40 and MPLS forwarding tables 42A-42N ("MPLS forwarding tables 42") generated by routing engine 28. Specifically, the forwarding components of IFCs 23 determine a next hop for each inbound packet based on forwarding information 40, identify the corresponding one of IFCs 23 associated with the next hop, and relay the packets to the appropriate one of IFCs 30 via switch 30 and corresponding ones of data paths 32.

IFCs 23 may further include and maintain MPLS forwarding tables 42. MPLS forwarding tables 42 correlate labels or portions of labels associated with incoming MPLS packets with next hops. In accordance with the techniques of this disclosure, MPLS forwarding tables 42 may be extended to associate one or more services associated with one or more portions of a doublewide MPLS label. The forwarding table may include definitions for a type and length or set amount of information of each portion of a doublewide MPLS label. That is, each of MPLS forwarding tables 42 may comprise an entry for one or more portions of a label, where each label entry includes one or more fields indicating the number of fields and size of each portion of the label, one or more actions to take with respect to the label, one or more services to provide for the label, and/or a scope or data type and a set length or amount associated with each portion of the label. This aspect of MPLS forwarding table 42 is illustrated in FIG. 2 as service information 44' to denote that this service information is a derivative of service information 44.

In one example, routing engine 28 maintains master copies of MPLS forwarding tables 42 and distributes copies of these tables to each of IFCs 23. Routing engine 28 may add, remove, or modify entries to MPLS forwarding tables 42 and may distribute updated copies to IFCs 23. In another example, routing engine 28 may parse the information in MPLS forwarding tables 42 and send only that forwarding information needed by each of IFCs 23 based on the interfaces associated with each of IFCs 23.

According to the label distribution techniques, e.g., of LDP, router 22 may resolve paths through a network, such as network 14, to which router 22 belongs. To resolve paths, routing engine 28 of router 22 may employ MPLS protocol module 36 to swap or alter routing information 34 with other peer network devices. In the case of LDP, MPLS protocol module 36 may establish one or more LDP sessions with LDP peers to exchange routing information 34. Routing information 34 may therefore include the label space utilized by routing engine 28 in routing MPLS packets through the network. Routing engine 38 may therefore establish or participate in one or more paths through the network in accordance with the MPLS protocol as implemented by MPLS protocol module 36.

When establishing paths, MPLS protocol module 36 may dynamically negotiate or otherwise specify service information associated with portions of doublewide MPLS labels used in forwarding MPLS packets along a given path to be established. Admin 39 may configure MPLS protocol module 36 with one or more FECS, each with two or more label portions and a type and length or set amount of information to negotiate for each path via interactions with a user interfaces presented by user interface module 38. Alternatively, admin 39 may statically configure a MPLS protocol module, similar to MPLS protocol module 36, of each network device, such as router 22, within a given network to define the type and the length or set amount of service information to transmit with each corresponding label or portion of a label.

While shown as directly interacting with user interface module 38, admin 39 may interact with another intermediate device, such as a provisioning system or device, to facilitate more efficient configuration of network devices. That is, admin 39 may specify either the negotiation parameters to be used in dynamically determining the scope, e.g., the type and length or set amount, of the service information associated with each portion of a label or scope of the service information itself (when statically configured). The provisioning system may then interact with each network devices, such as router 22, on behalf of admin 39 to configure these devices according to the input entered by admin 39 to the provisioning system. In this instance, user interface module 38 may present a user interface by which the provisioning system or any other computing device may interact to input configuration information, such as that discussed above. The user interface may, in these instances, accept as input scripts or other files that define a list of commands to quickly input the configuration. The user interface, in these instances, may comprise a Command Line Interface (CLI), for example.

After establishing the path and possibly negotiating the scope of service information to be associated with labels used along the path, routine engine 28 may update routing information 34 to reflect the path and install within one or more of forwarding information 40 and MPLS forwarding tables 42 the bindings or correlations between labels and next hops for the particular path, as well as define service information 44' within respective MPLS forwarding tables 42. Routine engine 28 may continue to resolve paths and update IFCs 23 in this manner, and as a result, routing engine 28 may resolve and install a first and second path, or in other words, a plurality of paths within IFCs 23.

IFCs 23 may, meanwhile, receive packets. As router 22 is assumed for purposes of illustration to represent a transit network device, IFCs 23 may generally receive MPLS packets that correspond to a particular one of the plurality of paths resolved by routing engine 28. IFCs 23 may inspect, for each MPLS packet, a top-most or first label included within the label stack defined by the MPLS header of the MPLS packet. IFC 23A may, for example, upon receiving an MPLS packet via link 23A and inspecting the MPLS packet in this above manner, use the determined top-most label as a key into MPLS forwarding table 42A. IFC 23A may retrieve a label entry based on the top-most label and determine a next hop associated with the label, an action to take (e.g., pop, swap, or push), and the scope of the service information, e.g., a type and length or set amount of service information, based on service information 44'.

IFC 23A may then take the action specified by the corresponding label entry. If the action indicates a swap (as is most likely considering that router 22 is assumed to be a transit network device), IFC 23A may replace swap the top-most label with the label indicated by the action and possibly add, remove and/or update the service information associated with the previous label based on service information 44'. That is, the label entry may indicate that the service information associated with the label needs to be swapped with other service information 44' or that a portion of the service information associated with a label need to be replaced or removed. Alternatively, IFC 23A may swap the label leaving any corresponding service information unaltered.

If the action indicates a pop, IFC 23A may remove the top-most label from the label stack. If the action indicates a push, IFC 23A may remove the top-most label of the label stack and any service information associated with the label in a manner similar to that of the pop, only the push action adds the set amount of service information defined by label entry below the associated label in the stack.

After taking the above described action, IFC 23A may forward the MPLS packet to the one of IFCs 23 associated with the next hop, as specified by forwarding information 40A. That is, IFC 23A accesses forwarding information 40A using the next hop as a key to retrieve an entry associated with the next hop. The next hop entry may comprise a label assigned to the next network device along the path associated with the top-most label. The next hop entry may identify one of IFCs 23 that couples to the next hop, and IFC 23A may forward the MPLS packet via switch 30 and data paths 32 to the identified one of IFCs 32, which proceeds to forward the MPLS packet via a corresponding one of outbound links 26.

Admin 39 may further interact with a user interface, either the same user interface described above or a different or second user interface, to view information associated with one or more doublewide MPLS packets. In particular, admin 39 may interact with the user interface to cause routing engine 28 to configure IFCs 23 to begin monitoring the traffic associated with one or more portions of one or more MPLS labels.

Once configured in this manner, IFCs 23 may, upon accessing a particular label entry, determine a type and length of each portion of service information 44' associated with a particular label, as described above. To log this information, IFCs 23 may each access the label portions associated with one or more labels in the label stack of each MPLS header as defined by each corresponding label entry in MPLS forwarding table 42A (e.g., as defined by service information 44'). IFCs 23 may copy, parse, or otherwise determine this service information according to the corresponding scopes of the service information and forward this service information to routing engine 28. Routine engine 28 may maintain this logged service information as service information 44. Service information 44 may include an entry for each label that identifies a type and scope of the service information as well as the actual service information extracted by IFCs 23.

User interface module 38 may access service information 44 to retrieve one or more entries of service information 44. Admin 39 either directly or via another computing device, such as a provisioning system, may filter service information 44 by providing criteria by which user interface module 38 retrieves entries of service information 44. For example, admin 39 may indicate that the user interface only present service information corresponding to a particular criteria, such as a particular service. User interface module 38 may then access service information 44 and retrieve only service information 44 that corresponds to the criteria specified by admin 39. Moreover, admin 39 may indicate a particular source address identified by the service information and user interface 39 may only retrieve that service information 44 that indicates the particular value specified by admin 39.

Further, user interface module 38 may perform other operations to facilitate the ease with which admin 39 views and retrieves the data. In this respect, user interface module 39 may pre-process the retrieved portions of service information 44 to present these portions graphically in a chart, table, graph, or other graphical manner via the user interface. As a result, admin 39 may more quickly view and understand service information 44 and possibly better troubleshoot or debug paths, such as path 18, through a network, such as network 14.

Router 22 shown in FIG. 2 is illustrated for the purposes of example. Alternatively, router 22 may have a centralized control unit having a routing engine and a forwarding engine. In this example, forwarding functionality is not distributed to IFCs 23, but centralized within the forwarding engine. However, for ease of illustration, the principles of the techniques of this disclosure are illustrated in the context of router 22.

Router 22 represents an example of a network device that may issue a label request message. Likewise, router 22 also represents an example of a service network device that may provide services to packets encapsulated by a service label (e.g., a 40-bit label) issued in a label mapping message. A control unit, such as one or more hardware-based processing elements configured to execute routing engine 28, may be configured to perform one or more tasks associated with generating a label request message and/or a label mapping messages, as well as to perform services when router 22 is configured as a service network element.

Thus, router 22 represents an example of a network device including one or more network interfaces configured to send and receive network data. Router 22 may further include a control unit configured to receive, via the one or more network interfaces, a packet to be forwarded according to a label switching protocol. The control unit may then determine a service to be performed on the packet by a service network device. The control unit may also send, via the one or more network interfaces, a label request message to the service network device. In accordance with the techniques of this disclosure, the label request message may indicate support for labels having a particular length, where the particular length is larger than twenty bits. The label request message may also specify the service to be performed on the packet. The control unit of router 22 may then receive, via the one or more network interfaces in response to the label request message, a label mapping message defining a label of the particular length. Accordingly, the control unit may append the label to the packet to form a Multi-Protocol Label Switching (MPLS)-encapsulated packet, and forward the MPLS-encapsulated packet according to the label switching protocol.

Router 22 also represents an example of a service network device that is configured to receive a label request message from a second network device. The label request message may indicate support for labels having a particular length, such that the particular length is larger than twenty bits. The label request message may also specify a service to be performed on a packet by router 22. The control unit may then associate a label of the particular length with the service. The control unit may also send, in response to the label request message, a label mapping message defining the label of the particular length associated with the service. Subsequently, the control unit of router 22 may receive a packet encapsulated with the label, and perform the service on the packet based on the label.

FIG. 3 is a conceptual diagram illustrating an example 52-bit label stack 50 including 40-bit label 52. Label stack 50 includes experimental use field ("EXP") 54, bottom of stack ("S") bit 56, and time to live ("TTL") field 58, in addition to 40-bit label 52. These values are set according to RFC-3032, Rosen et al., "MPLS Label Stack Encoding," Network Working Group, January 2001, available at http://tools.ietf.org/html/3032, which is hereby incorporated by reference in its entirety. Label stacks may include other labels in addition to 40-bit label 52. In some examples, label stacks, such as label stack 50, may include a combination of 20-bit labels and 40-bit labels. Moreover, in still other examples, the techniques of this disclosure may be used to extend labels to other numbers of bits besides 20-bit and 40-bit labels, and to define syntax and semantics to such labels.

A 40-bit label, such as 40-bit label 52, has no pre-defined semantics, and may be programmed with any format suitable for the forwarding and identification of traffic to or from service nodes, e.g., one or more of network devices 12 of FIG. 1. The programmability of a label, in accordance with the techniques of this disclosure, may provide a more flexible service deployment model, as the format of the label may be tailored to meet specific service requirements. For example, the first 8 bits may be programmed to identify a service instance, and the next 32 bits may be used to identify a subscriber of that service. Network devices 12 may program a 40-bit label, such as 40-bit label 52, using the techniques of this disclosure, e.g., as described with respect to FIGS. 4-9.

Figure 4:
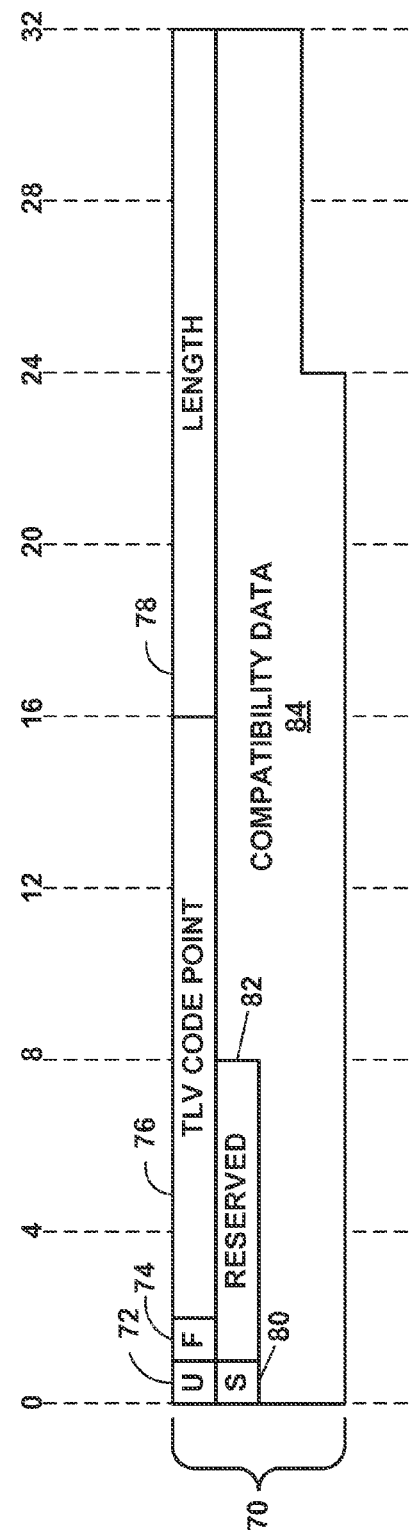
FIG. 4 is a conceptual diagram illustrating an example set of data for a Layer 4 (L4) to Layer 7 (L7) service instance capability indicator.

FIG. 4 is a conceptual diagram illustrating an example set of data for a Layer 4 (L4) to Layer 7 (L7) service instance capability indicator 70. Indicator 70 is generally associated with a particular capability, which is in turn associated with a capability document. In accordance with the techniques of this disclosure, network nodes, such as network devices 12, indicate support for 40-bit labels during an RFC-5036 session initialization using procedures documented in RFC-5561.

As described in RFC-5561, LDP enhancements requiring LDP capability advertisements are specified in a capability document that describes the motivation for the enhancement, specifies the behavior of LDP when the enhancement is enabled, includes an IANA considerations section that requests IANA assignment of a code point from a TLV namespace, and describes the interpretation and processing of associated capability data, if present. Indicator 70 fulfills these requirements of RFC-5561 to describe an L4-L7 service instance capability when instantiated as discussed below.

Indicator 70 includes U-bit 72, F-bit 74, type-length-value (TLV) code point 76, length value 78, S-bit 80, reserved field 82, and compatibility data 84. U-bit 72 corresponds to an Unknown TLV bit, as described in RFC-5036. The value of U-bit 72 can be either "0" or "1," as specified in the associated capability document. F-bit 74 corresponds to a Forward Unknown TLV bit, as described in RFC-5036. In this example, the value of F-bit 74 is set to 0, because a Capability Parameter TLV is sent only in Initialization and Capability messages, which are not forwarded.

TLV code point 76 is a TLV that identifies a specific capability. In this example, TLV code point 76 has a length of 14 bits and a value that is an Internet Assigned Numbers Authority (IANA)-assigned code point from a TLV namespace for a given capability, as requested in the associated capability document. S-bit 80 is a state bit that indicates whether a sender of indicator 70 is advertising or withdrawing the capability corresponding to TLV code point 76. In this example, the value of S-bit 80 is assigned and interpreted as follows:
  1: indicator 70 is advertising the capability specified in TLV code point 76
  0: indicator 70 is withdrawing the capability specified in TLV code point 76

Reserved field 82 represents 7 bits of data that are reserved for future use. Length value 78 is a 16 bit field that describes a length of compatibility data 84. Compatibility data 84 includes any information about the capability in addition to TLV code point 76 needed to fully specify the capability. The method for interpreting and processing compatibility data 84 is specific to TLV code point 76 and is described in the capability document that specifies the capability, as described in RFC-5561. As noted above, the length of compatibility data 84 is variable, as described by length value 78.

In accordance with the techniques of this disclosure, compatibility data 84 describes a particular capability associated with a particular 40-bit label. Thus, when one of network devices 12 advertises a capability associated with a particular 40-bit label, and the corresponding TLV code point 76 does not fully describe the capability, the network device includes data in compatibility data 84 that further describes the capability. This description may include, for example, syntax descriptions that partition the 40 bits of a 40-bit label into two or more fields and semantics for each of the fields of the 40-bit label. The semantics generally indicate how values for the fields are to be interpreted, and may depend on values of other fields.

Thus, in some examples, a network device advertising an L4-L7 Service Instance capability constructs an L4-L7 Service Instance capability indicator according to the format of indicator 70, including data in the fields based on the description of these fields above. For example, in accordance with the techniques of this disclosure, the network device sets the value of TLV code point 76 for a L4-L7 Service Instance based on an IANA value for the TLV code point of the capability, and further describe the capability in capability data 84.

Figure 5:
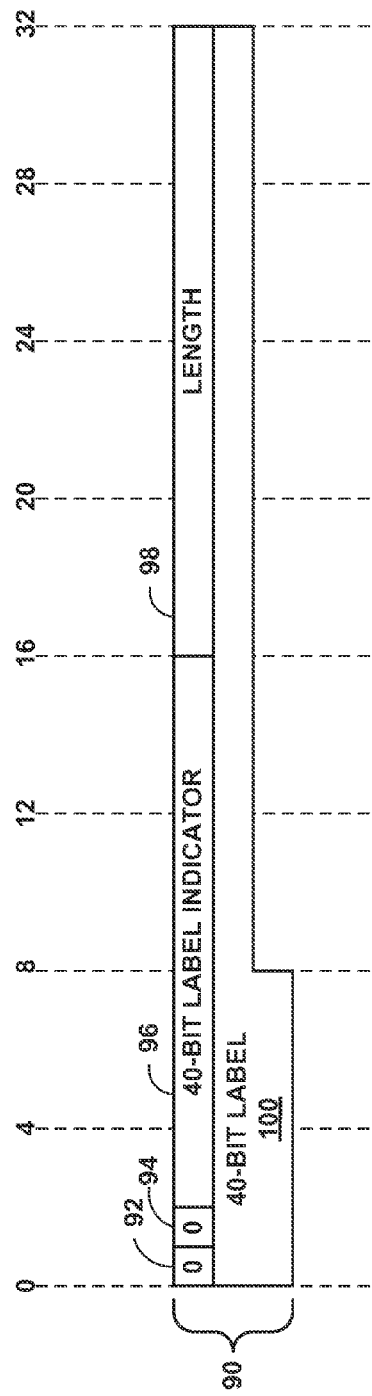
FIG. 5 is a conceptual diagram illustrating an example 40-bit label type-length-value (TLV) field.

FIG. 5 is a conceptual diagram illustrating an example 40-bit label TLV 90. Network nodes, such as network devices 12 (FIG. 1), advertise MPLS label mappings in a Label Mapping message, in accordance with RFC-5036. However, RFC-5036 is defined on the assumption that labels are 20-bits, and this is carried as part of the Label Mapping message within a "Generic Label" TLV. Therefore, rather than using the "Generic Label" TLV to advertise a 40-bit label, network devices 12 use a 40-bit label TLV, such as 40-bit label TLV 90, to advertise 40-bit labels. 40-bit label TLV 90 includes two zero-valued bits 92, 94, followed by a 40-bit label indicator 96, which indicates that the type for 40-bit label TLV 90 is a type of TLV that advertises a 40-bit label. Zero-valued bits 92, 94 may conform substantially to U-bit 72 and F-bit 74, respectively, in terms of their semantics.

Length field 98 describes the length of 40-bit label field 100, which in this case is 40-bits. In other examples, for other lengths of labels, length field 98 describes the appropriate length of the label being advertised. That is, if an N-bit label is being advertised, where N is an integer, length field 98 has a value indicating that the field corresponding to 40-bit label field 100 (which in this case would be an "N-bit label" field) has N bits. Moreover, in this example, 40-bit label TLV 90 includes the actual 40-bit label value in 40-bit label field 100. Thus, as opposed to the 20-bit labels advertised using the Generic Label TLV of RFC-5036, an N-bit label TLV, similar to 40-bit label TLV 90, may be used to advertise N-bit (e.g., 40-bit) labels, in accordance with the techniques of this disclosure.

Figure 6:
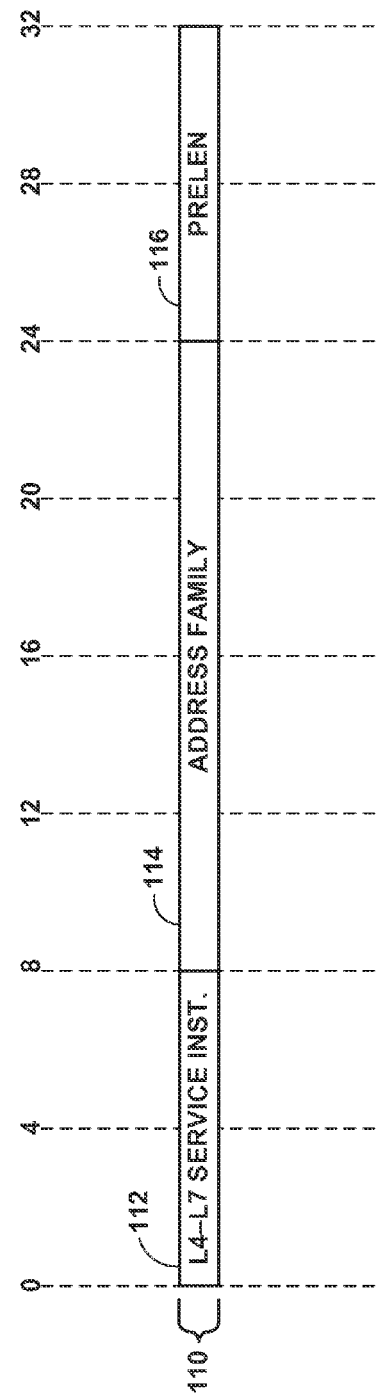
FIG. 6 is a conceptual diagram illustrating an example forwarding equivalence class (FEC) element.

FIG. 6 is a conceptual diagram illustrating an example forwarding equivalence class (FEC) element 110. A network node, such as one of network devices 12 (FIG. 1), may request a label mapping message from a peer, such as a different one of network devices 12, using a Label Request message. A FEC element "L4-L7 Service Instance" may be defined according to the format of FEC element 110, so that an LDP speaker can associate an inbound Label Request as requiring a 40-bit label assignment and association of the request to a particular L4-L7 service instance.

FEC element 110 includes L4-L7 service instance 112, address family field 114, and PreLen field 116. Address family field 114 includes data that encodes an address family for the forwarding equivalence class of the L4-L7 service instance. PreLen field 116 generally corresponds to a field that describes a length in bits of an address prefix that follows PreLen field 116. In this example, FEC element 110 does not include an address prefix field, and therefore, PreLen field 116 has a value of zero. FEC element 110 represents an example of a FEC Element having a type name of "L4-L7 Service Instance," with a type of "0x99," and a value of "no value." That is, the "value" indicates zero-value octets.

Figure 7:
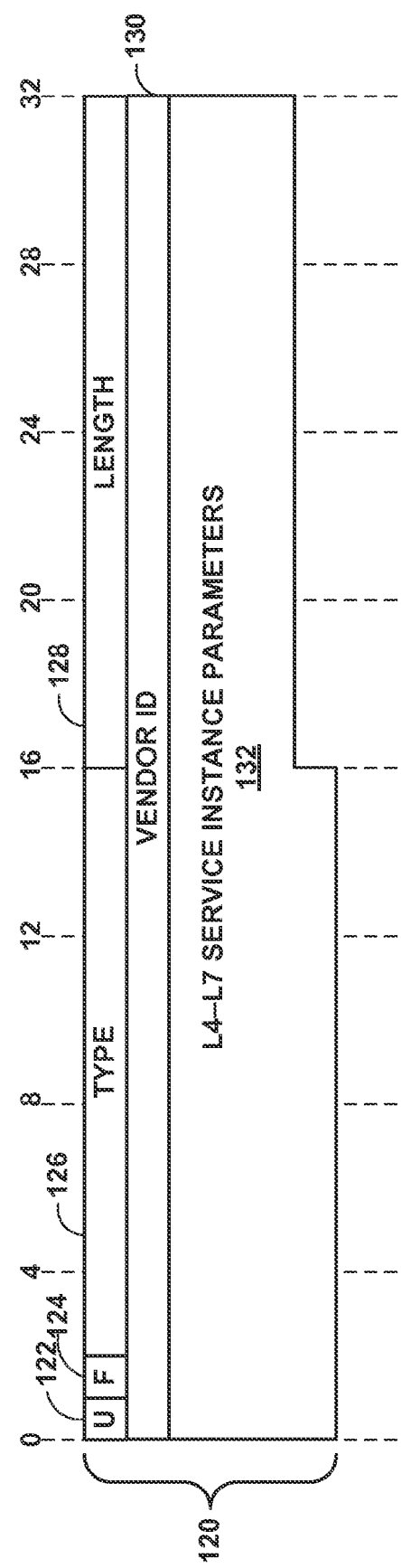
FIG. 7 is a conceptual diagram illustrating an example L4-L7 Service Instance TLV including data for parameters of a requested service.

FIG. 7 is a conceptual diagram illustrating an example L4-L7 Service Instance TLV 120 including data for parameters of a requested service. When a network node, such as one of network devices 12, requests a label mapping message for a particular service instance from a service node, the network node includes within a Label Request message any specific parameters that are necessary for the requested service. These parameters may include a subscriber identifier (subscriber-ID), service type, service capacity, and the like. L4-L7 Service Instance TLV 120 represents an example of a TLV in which such parameters are carried as optional parameters within a label request message.

In this example, L4-L7 Service Instance TLV 120 includes U-bit 122, F-bit 124, type field 126, length field 128, vendor ID field 130, and L4-L7 service instance parameters data 132. U-bit 122 and F-bit 124 may conform substantially to U-bit 72 and F-bit 74, respectively, in terms of their semantics. Type field 126 includes a value in the range of 0x3E00 to 0x3EFF. The leading zeros of the hexadecimal "3" of Type field 126 may be omitted, such that type field 126 has a length of fourteen bits to represent the value in the range of 0x3E00 to 0x3EFF, rather than sixteen bits. That is, the binary prefix of the value of type field 126 may comprise "1 1 1 1 1 0_ _ _ _ _ _ _ _ _," rather than "0 0 1 1 1 1 1 0_ _ _ _ _ _ _ _," where underscores "_" represent non-prefix bits, having values of either "0" or "1."

Figure 8:
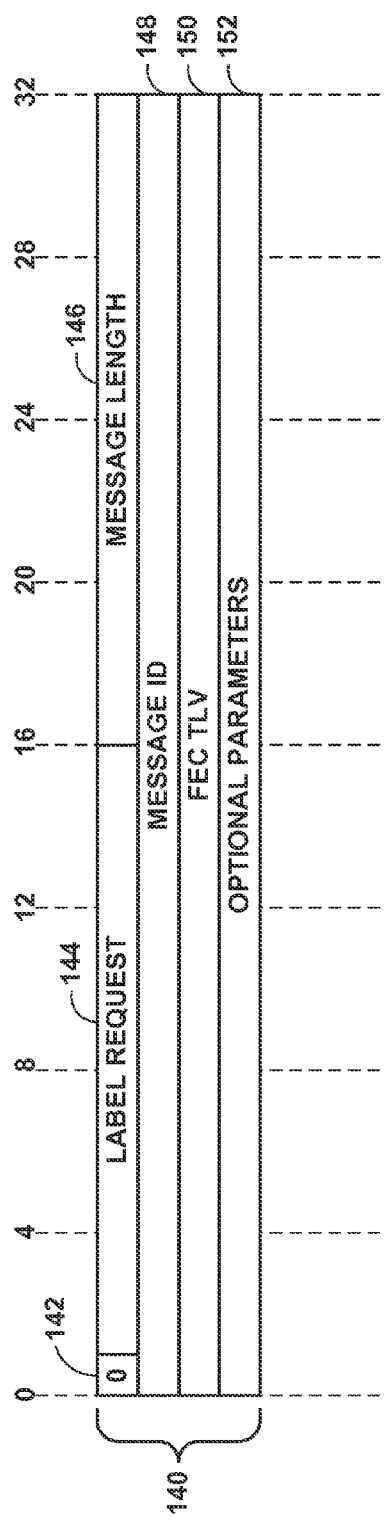
FIG. 8 is a conceptual diagram illustrating an example label request message.

FIG. 8 is a conceptual diagram illustrating an example label request message 140. When a network node, such as one of network elements 12, requires a particular service function available at a given service node, such as a different one of network elements 12, the network node requests that service and passes any specific parameters using a Label Request message, e.g., in accordance with the format of label request message 140. The service node then allocates a 40-bit label, based upon the contents of the Label Request message. Service setup and label distribution is therefore downstream on demand in nature.

In this example, label request message 140 includes zero bit 142, label request field 144, message length field 146, message identifier (ID) field 148, FEC TLV field 150, and optional parameters field 152. Label request field 144 generally indicates that label request message 140 is a request for a label, e.g., a 40-bit label. Message length data 146 includes data specifying the length of label request message 140, e.g., of message ID field 148, FEC TLV field 150, and optional parameters field 152.

Message ID field 148 generally includes data specifying a unique identifier for label request message 140. FEC TLV field 150 includes the "L4-L7 Service Instance" TLV elements described with respect to FIG. 6. Thus, a service node receiving label request message 140 can use the data of FEC TLV field 150 to determine procedures for allocating a 40-bit label and for extracting optional parameters for the network node that requested the label. Optional parameters field 152 includes data that contains an instantiation of the "L4-L7 Service Instance" TLV of FIG. 7.

FIG. 9 is a conceptual diagram illustrating an example label mapping message 160. In response to receiving a label request message of the format described with respect to label request message 140 (FIG. 8), along with any extracted, optional parameters, a Service Node allocates an appropriate label (e.g., 40-bit label) for a corresponding service. In this example, label mapping message 160 includes zero bit 162, label request field 164, message length field 166, message identifier (ID) field 168, FEC TLV field 170, 40-bit label TLV 172, and optional parameters field 174. In general, message identifier (ID) field 168 corresponds substantially to message ID field 148, FEC TLV field 170 corresponds substantially to FEC TLV field 150, and optional parameters field 174 corresponds substantially to optional parameters field 152.

Although the lengths of FEC TLV 170, 40-bit label TLV 172, and optional parameters 174 are shown as 32 bits, it should be understood that the lengths of these fields may be other than 32 bits in various examples. For example, 40-bit label TLV 172 may have a length of 72 bits, as discussed with respect to 40-bit label TLV 90 of FIG. 5.

In this example, 40-bit label TLV 172 includes data defining a 40-bit label TLV, such as 40-bit label TLV 172 of FIG. 5. Label mapping field 164 includes data indicating that label mapping message 160 includes a mapping from a 40-bit label to a label request, such as label request message 140. A service node may use the data of a label request message to construct a label mapping message. That is, a service node may receive a label request message, similar to label request message 140, and respond with a label response message, such as label mapping message 160. In this manner, label mapping message 160 generally includes data of a label that is mapped to a service specified in a label request message, such as label request message 140.

Figure 10:
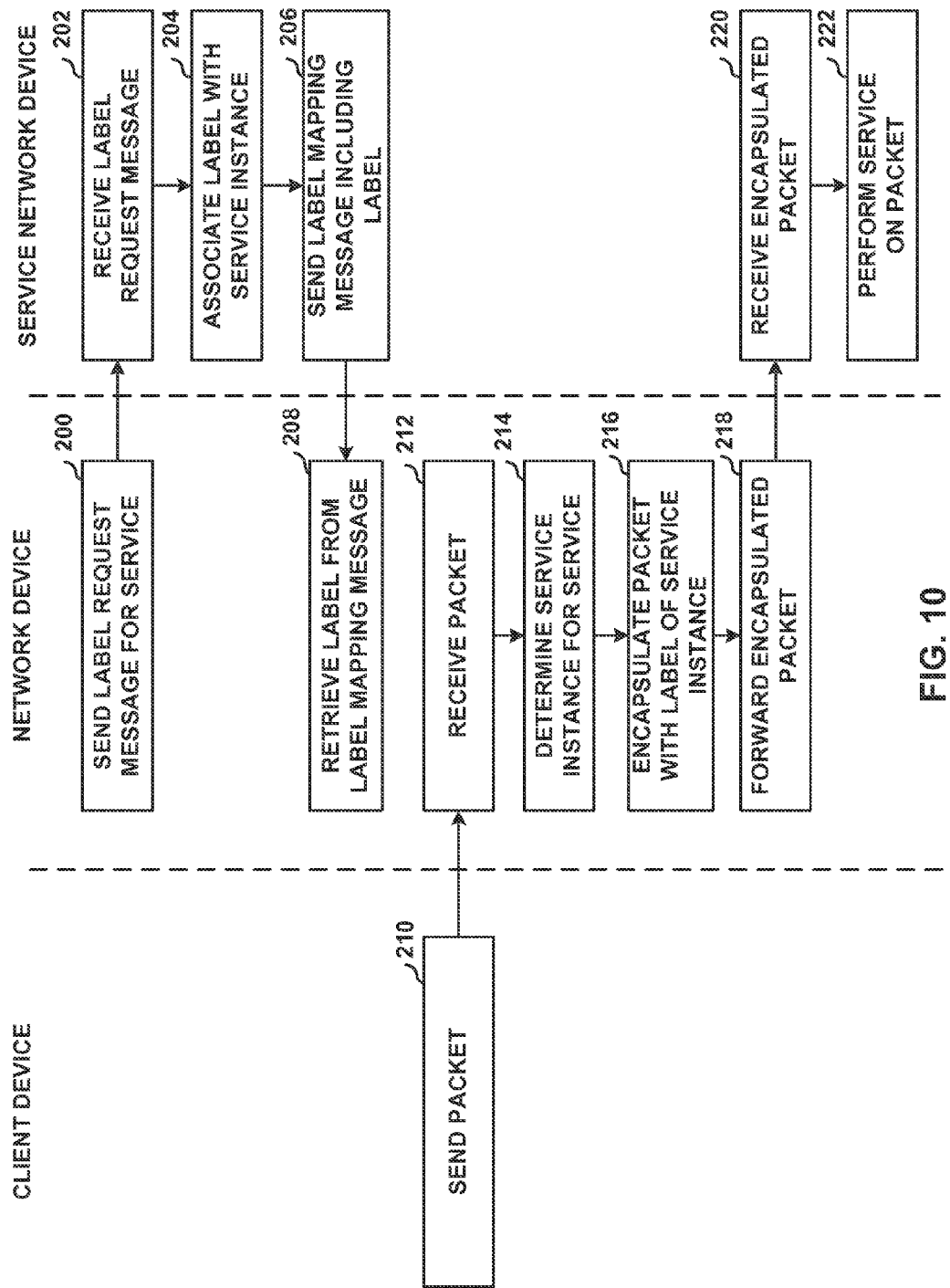
FIG. 10 is a flowchart illustrating an example method for requesting and supplying 40-bit labels in accordance with the techniques of this disclosure.

FIG. 10 is a flowchart illustrating an example method for requesting and supplying 40-bit labels in accordance with the techniques of this disclosure. For purposes of explanation, the method of FIG. 10 is described with respect to a client device, a network device, and a service network device. The client device may correspond to one of client devices 16 (FIG. 1), the network device may correspond to a label edge router (LER), such as network device 12A (FIG. 1), and the service network device may correspond to one of network devices 12, other than network device 12A, that provides a particular service.

Initially, in this example, a network device (e.g., an LER) constructs a label request message that specifies a service and support for a label of a particular length, e.g., 40-bits (200). The label request message may conform to label request message 140 of FIG. 8. Thus, the label request message may include a forwarding equivalence class (FEC) TLV that specifies a FEC for the corresponding client device, as well as optional parameters. The FEC TLV may conform to FEC element 110 of FIG. 6, while the optional parameters may conform to L4-L7 Service Instance TLV 120 of FIG. 7. In any case, the network device sends the label request message for the service to the service network device.

The service network device receives the label request message from the network device (202). In response, the service network device associates a label with the service instance (204). In particular, the label has a length as indicated by the label request message. For example, when the label request message indicates support for 40-bit labels, the label mapping message includes a 40-bit label that is mapped to the service instance. The label mapping message may conform to label mapping message 160 of FIG. 9. Thus, the label mapping message may include a 40-bit label TLV, which may conform to 40-bit label TLV 90 of FIG. 5. Of course, similar data structures may be used to support other lengths of labels, e.g., other labels having lengths longer than 20 bits.

The service network device then sends the label mapping message including the label of the particular length to the requesting network device (206). Accordingly, the network device retrieves the label from the label mapping message (208). For example, the network device may extract data corresponding to 40-bit label 100 of 40-bit label TLV 90 (FIG. 5), included in a 40-bit label TLV 172 of the label mapping message, assuming that the label mapping message conforms to label mapping message 160 of FIG. 9. These label distribution techniques may therefore be described as downstream on demand in nature, in that a network device requests a label from a downstream service network device as the label is needed. The network device may then program elements of the forwarding plane of the network device based on the data of the label. For example, assuming that the network device conforms to router 22 (FIG. 2), routing engine 28 may update routing information 34 using data of the label, which may further cause reprogramming of forwarding information 40 in IFCs 23. Steps 200 through 208 may be performed for each service requiring a label. Thus, the network device may obtain labels having lengths greater than 20 bits for one or more services of one or more various service instances using these techniques.

In this example, after receiving labels for one or more services, a client device sends a packet (210), which is to be tunneled through a network (e.g., network 14 of FIG. 1). In addition, the client device is a subscriber to one or more particular services, namely the services provided by the service network device for which labels were distributed, as discussed above. The network device receives the packet from the client device (202) and determines service instances for the services to be performed on the packet (204). For example, the network device may determine a FEC for the packet based on the client device from which the packet was received. The network device then encapsulates the packet with the label corresponding to the service within that service instance (216). Of course, the network device may also encapsulate the packet with other labels, e.g., other service labels for other services and/or labels associated with a network tunnel through network 14.

The network device then forwards the encapsulated packet (218). In particular, the network device forwards the encapsulated packet along a network tunnel, of which the service network device is also an element. The service network device may therefore comprise one of the "hops" along the network tunnel. Upon receiving the encapsulated packet (220), the service network device performs the corresponding service on the packet (222). The service network device may examine labels of the label stack that encapsulates the packet to determine services to be performed on the packet, as well as a next hop along the network tunnel.

After performing the service on the packet, the service network device forwards the packet to the next hop. In some examples, the service network device swaps a label at the top of the label stack prior to forwarding the packet. Thus, the service network device may comprise a label switch router (LSR) of the network. If the service network device is the last device along the network tunnel (e.g., an egress LER), the service network device may decapsulate the packet by removing the label stack from the packet. Alternatively, in some examples, the penultimate device along the network tunnel may decapsulate the packet by removing the label stack from the packet.

In some examples, rather than requesting one or more labels for one or more service instances prior to receiving packets of the service instances, the network device may request a label for a service in response to receiving a packet from a subscriber to that service.

In this manner, FIG. 10 represents an example of a method including sending, by a first network device, a label request message to request a label mapping from a second network device, wherein the label request message indicates support for labels having a particular length larger than twenty bits, and wherein the label request message specifies a service provided by the second network device and to be performed on packets subsequently forwarded to the second network device in accordance with the label mapping, receiving, in response to the label request message, a label mapping message defining a label of the particular length, appending, by the first network device, the label to a packet to form a Multi-Protocol Label Switching (MPLS)-encapsulated packet, and forwarding, by the first network device, the MPLS-encapsulated packet according to a label switching protocol.

Likewise, FIG. 10 also represents an example of a method including receiving, by a first network device, a label request message from a second network device, wherein the label request message indicates support for labels having a particular length, wherein the particular length is larger than twenty bits, and wherein the label request message specifies a service to be performed on a packet, associating a label of the particular length with the service, sending, in response to the label request message, a label mapping message defining the label of the particular length associated with the service, receiving a packet encapsulated with the label, and performing the service on the packet based on the label.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
   sending, by a first network device, a label request message to request a label mapping from a second network device, wherein the label request message indicates support for labels having a particular length larger than twenty bits, and wherein the label request message specifies a service provided by the second network device and to be performed on packets subsequently forwarded to the second network device in accordance with the label mapping;
   receiving, in response to the label request message, a label mapping message including a type value indicating that the label mapping message includes a label having the particular length larger than twenty bits and specifying the label of the particular length, wherein the type value of the label mapping message is different than a type value for label mapping messages that define twenty-bit labels;

appending, by the first network device, the label to a packet to form a Multi-Protocol Label Switching (MPLS)-encapsulated packet; and forwarding, by the first network device, the MPLS-encapsulated packet according to a label switching protocol.

2. The method of claim 1, wherein the particular length comprises forty bits.

3. The method of claim 1, further comprising:
determining a service instance for the service provided by the second network device; and
forming the label request message to specify a forwarding equivalence class (FEC) associated with the service instance, wherein the FEC represents specification of the service to be performed on the packet.

4. The method of claim 1, further comprising:
determining one or more parameters associated with the service; and
forming the label request message to specify the one or more parameters.

5. The method of claim 4,
wherein the one or more parameters comprise at least one of a subscriber identifier for a client device from which the packet was received, a service type that indicates a type for the service, and a service capacity that indicates a capacity to be associated with the service, and
wherein forming the label request message comprises forming the label request message to specify a forwarding equivalence class (FEC) specific to the service and to include a TLV specific to the FEC to carry the parameters for the requested service.

6. The method of claim 1, further comprising:
receiving, by the first network device, the packet to be forwarded according to the label switching protocol; and
determining, by the first network device, a service to be performed on the packet by the second network device.

7. The method of claim 1, further comprising receiving, by the first network device, a service instance capability indicator from the second network device during a label distribution session, wherein the service instance capability indicator provides an indication of a service instance supported by the second network device, and wherein the service instance capability indicator indicates that the second network device supports labels having the particular length.

8. The method of claim 7, further comprising:
receiving a plurality of service instance capability indicators from a plurality of service network devices including the second network device; and
selecting the second network device based at least in part on the service instance capability indicator received from the second network device,
wherein sending the label request message comprises sending the label request message to the second network device based on the selection.

9. The method of claim 1, wherein the particular length is a multiple of twenty.

10. A network device comprising:
one or more network interfaces configured to send and receive network data; and
a control unit configured to send, via the one or more network interfaces, a label request message to request a label mapping from a service network device, wherein the label request message indicates support for labels having a particular length larger than twenty bits, and wherein the label request message specifies a service provided by the service network device and to be performed on packets subsequently forwarded to the service network device in accordance with the label mapping, receive, via the one or more network interfaces in response to the label request message, a label mapping message including a type value indicating that the label mapping message includes a label having the particular length larger than twenty bits and specifying the label of the particular length, wherein the type value of the label mapping message is different than a type value for label mapping message that define twenty-bit labels, append the label to a packet to form a Multi-Protocol Label Switching (MPLS)-encapsulated packet, and forward the MPLS-encapsulated packet according to a label switching protocol.

11. The network device of claim 10, wherein the particular length comprises forty bits.

12. The network device of claim 10, wherein the control unit is further configured to determine a service instance for the service provided by the service network device, and form the label request message to specify a forwarding equivalence class (FEC) associated with the service instance, wherein the FEC represents specification of the service to be performed on the packet.

13. The network device of claim 10, wherein the control unit is further configured to determine one or more parameters associated with the service, and form the label request message to specify the one or more parameters.

14. The network device of claim 13, wherein the one or more parameters comprise at least one of a subscriber identifier for a client device from which the packet was received, a service type that indicates a type for the service, and a service capacity that indicates a capacity to be associated with the service, and wherein the control unit is configured to form the label request message to specify a forwarding equivalence class (FEC) specific to the service and to include a TLV specific to the FEC to carry the parameters for the requested service.

15. The network device of claim 10, wherein the control unit is configured to receive, via the one or more network interfaces, a service instance capability indicator from the service network device during a label distribution session, wherein the service instance capability indicator provides an indication of a service instance supported by the service network device, and wherein the service instance capability indicator indicates that the service network device supports labels having the particular length.

16. The network device of claim 15, wherein the service network device comprises one of a plurality of service network devices, wherein the control unit is further configured to receive a plurality of service instance capability indicators from the plurality of service network devices, select the one of the plurality of service network devices based at least in part on the service instance capability indicator received from the one of the plurality of service network devices, and send the label request message to the second network device based on the selection.

17. A non-transitory computer-readable storage medium comprising instructions that, when executed, cause a processor of a first network device to:
send a label request message to request a label mapping from a second network device, wherein the label request message indicates support for labels having a particular length larger than twenty bits, and wherein the label request message specifies a service provided by the second network device and to be performed on packets subsequently forwarded to the second network device in accordance with the label mapping;

receive a label mapping message including a type value indicating that the label mapping message includes a label having the particular length larger than twenty bits and specifying the label of the particular length, wherein the type value of the label mapping message is different than a type value for label mapping message that define twenty-bit labels;

append the label to a packet to form a Multi-Protocol Label Switching (MPLS)-encapsulated packet; and forward the MPLS-encapsulated packet according to a label switching protocol.

18. The non-transitory computer-readable storage medium of claim 17, wherein the particular length comprises forty bits.

19. The non-transitory computer-readable storage medium of claim 17, further comprising instructions that cause the processor to:

determine a service instance for the service provided by the second network device; and form the label request message to specify a forwarding equivalence class (FEC) associated with the service instance, wherein the FEC represents specification of the service to be performed on the packet.

20. The non-transitory computer-readable storage medium of claim 17, further comprising instructions that cause the processor to:

determine one or more parameters associated with the service; and form the label request message to specify the one or more parameters.

21. The non-transitory computer-readable storage medium of claim 20, wherein the one or more parameters comprise at least one of a subscriber identifier for a client device from which the packet was received, a service type that indicates a type for the service, and a service capacity that indicates a capacity to be associated with the service, and wherein the instructions that cause the processor to form the label request message comprise instructions that cause the processor to form the label request message to specify a forwarding equivalence class (FEC) specific to the service and to include a TLV specific to the FEC to carry the parameters for the requested service.

22. The non-transitory computer-readable storage medium of claim 17, further comprising instructions that cause the processor to receive a service instance capability indicator from the second network device during a label distribution session, wherein the service instance capability indicator provides an indication of a service instance supported by the second network device, and wherein the service instance capability indicator indicates that the second network device supports labels having the particular length.

23. The non-transitory computer-readable storage medium of claim 22, further comprising instructions that cause the processor to:

receive a plurality of service instance capability indicators from a plurality of service network devices including the second network device; and select the second network device based at least in part on the service instance capability indicator received from the second network device, wherein the instructions that cause the processor to send the label request message comprise instructions that cause the processor to send the label request message to the second network device based on the selection.

24. A method comprising:

receiving, by a first network device, a label request message from a second network device, wherein the label request message indicates support for labels having a particular length, wherein the particular length is larger than twenty bits, and wherein the label request message specifies a service to be performed on a packet;

associating a label of the particular length with the service;

sending, in response to the label request message, a label mapping message including a type value indicating that the label mapping message includes a label having the particular length larger than twenty bits and specifying the label of the particular length associated with the service, wherein the type value of the label mapping message is different than a type value for label mapping message that define twenty-bit labels;

receiving a packet encapsulated with the label; and performing the service on the packet based on the label.

25. The method of claim 24, wherein the particular length comprises forty bits.

26. The method of claim 24, wherein to indicate support for labels having the particular length and wherein to specify the service, the label request message comprises information specifying a forwarding equivalence class (FEC) associated with a service instance, and wherein associating the label of the particular length with the service comprises associating the label of the particular length with the service based on the FEC specified in the label request message.

27. The method of claim 24, further comprising:

determining one or more parameters associated with the service from the label request message; and associating the label of the particular length with the service based at least in part on the one or more parameters.

28. The method of claim 27, wherein the one or more parameters comprise at least one of a subscriber identifier for a client device from which the packet was received, a service type that indicates a type for the service, and a service capacity that indicates a capacity to be associated with the service, and wherein the label request message specifies a forwarding equivalence class (FEC) specific to the service and includes a TLV specific to the FEC that carries the parameters for the requested service.

29. A system comprising:

a network device; and a service network device, wherein the network device is configured to send a label request message to request a label mapping from the service network device, wherein the label request message indicates support for labels having a particular length larger than twenty bits, and wherein the label request message specifies a service provided by the service network device to be performed on packets subsequently forwarded to the service network device in accordance with the label mapping, wherein the service network device is configured to receive the label request message, associate a label of the particular length with the service, and send, in response to the label request message, a label mapping message including a type value indicating that the label mapping message includes a label having the particular length larger than twenty bits and specifying the label of the particular length associated with the service to the network device, wherein the type value of the label mapping message is different than a type value for label mapping message that define twenty-bit labels, wherein the network device is configured to receive the label mapping message, append the label to a packet to form a Multi-Protocol Label Switching (MPLS)-encapsulated packet, and forward the MPLS-encapsulated packet according to a label switching protocol, and
wherein the service network device is configured to receive the MPLS-encapsulated packet, and perform the service on the packet based on the label.

* * * * *